United States Patent
Cili et al.

(10) Patent No.: US 11,490,453 B2
(45) Date of Patent: Nov. 1, 2022

(54) SELF-ORGANIZING DEVICE

(71) Applicant: Apple Inc., Cupertino, CA (US)

(72) Inventors: Gencer Cili, Oakville (CA); Sairam T. Gutta, Cupertino, CA (US); Ajoy K. Singh, Milpitas, CA (US); ChinShuo Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 16/872,165

(22) Filed: May 11, 2020

(65) Prior Publication Data

US 2020/0367316 A1  Nov. 19, 2020

Related U.S. Application Data

(60) Provisional application No. 62/849,022, filed on May 16, 2019.

(51) Int. Cl.
*H04W 84/18* (2009.01)
*H04L 12/26* (2006.01)
(Continued)

(52) U.S. Cl.
CPC ......... *H04W 84/18* (2013.01); *H04L 43/0817* (2013.01); *H04L 67/10* (2013.01); *H04W 88/06* (2013.01)

(58) Field of Classification Search
CPC ..... H04W 84/18; H04W 88/06; H04W 24/02; H04W 24/04; H04L 67/10; H04L 43/0817;
(Continued)

(56) References Cited

U.S. PATENT DOCUMENTS 9,113,353 B1 * 8/2015 Cotanis ................. H04W 24/02
9,628,365 B2    4/2017 Gelvin et al.
(Continued)

FOREIGN PATENT DOCUMENTS

CA    2859387 A1 *  6/2013  ......... A61K 31/7088
CA    3087484 A1 *  7/2019  ............ H04W 16/14
(Continued)

*Primary Examiner* — David R Lazaro
*Assistant Examiner* — Berhanu Shitayewoldetadik
(74) *Attorney, Agent, or Firm* — Kowert, Hood, Munyon, Rankin & Goetzel, P.C.

(57) ABSTRACT

A self-organizing device may include a recovery control module which may monitor different events from various different domains, for example from different layers of the software stack, associated with wireless communications of the device. Upon identifying a specific condition based on the monitored information, the device may execute a corresponding auto-recovery mechanism to mitigate adverse effects of the condition experienced by the device. Devices may provide monitored information to servers, e.g. to cloud servers, which may use expert systems to analyze the information collected from multiple devices, for example from globally dispersed devices, and may define mitigation action responses corresponding to specific scenarios or conditions that include device-specific considerations. The mitigating action responses may be deployed to the devices by the servers as expert system rules in the form of uncompiled code or hot patch code that the devices may later use to implement the necessary mitigation actions as warranted.

20 Claims, 16 Drawing Sheets

(51) Int. Cl.
*H04L 29/08* (2006.01)
*H04W 88/06* (2009.01)
*H04L 15/16* (2006.01)
*H04L 67/10* (2022.01)
*H04L 43/0817* (2022.01)

(58) Field of Classification Search
CPC ... H04L 41/145; H04L 43/0864; H04L 41/16; H04L 41/0672
USPC .......................................................... 370/329
See application file for complete search history.

(56) References Cited

U.S. PATENT DOCUMENTS

| | | | | |
|---|---|---|---|---|
| 10,237,754 | B1* | 3/2019 | Pawar | H04W 88/04 |
| 10,248,409 | B1* | 4/2019 | Pohlack | G06F 8/658 |
| 10,652,119 | B2* | 5/2020 | He | H04L 41/0663 |
| 10,698,668 | B1* | 6/2020 | Pohlack | G06F 8/71 |
| 2012/0051228 | A1* | 3/2012 | Shuman | H04W 24/08 370/242 |
| 2012/0307697 | A1* | 12/2012 | Mukhopadhyay | H04W 24/02 370/328 |
| 2014/0188723 | A1* | 7/2014 | Pacher | G06Q 20/4016 705/43 |
| 2014/0199993 | A1* | 7/2014 | Dhanda | H04W 88/08 455/423 |
| 2015/0133185 | A1* | 5/2015 | Chen | H04W 72/1215 455/552.1 |
| 2015/0318946 | A1* | 11/2015 | Abdelmonem | H04L 5/006 370/252 |
| 2015/0318964 | A1* | 11/2015 | Abdelmonem | H04W 24/10 370/329 |
| 2016/0165472 | A1* | 6/2016 | Gopalakrishnan | H04W 24/10 455/67.11 |
| 2016/0205697 | A1* | 7/2016 | Tan | H04W 24/02 370/329 |
| 2016/0285721 | A1* | 9/2016 | Lida | H04L 25/0292 |
| 2017/0324817 | A1* | 11/2017 | Oliveira | H04L 67/52 |
| 2017/0374625 | A1* | 12/2017 | Abdelmonem | H04W 24/10 |
| 2018/0176089 | A1* | 6/2018 | Ritter | H04L 41/0823 |
| 2019/0007290 | A1* | 1/2019 | He | H04L 41/0663 |
| 2019/0173898 | A1* | 6/2019 | Bharrat | H04L 41/0631 |
| 2019/0187690 | A1 | 6/2019 | Cella et al. | |
| 2019/0384591 | A1* | 12/2019 | Ramachandran | G06F 9/45558 |
| 2020/0099592 | A1* | 3/2020 | Mahindru | G06K 9/00536 |
| 2020/0100137 | A1* | 3/2020 | Panchal | H04W 72/0453 |
| 2020/0244556 | A1* | 7/2020 | Shevade | H04L 43/0817 |
| 2020/0344267 | A1* | 10/2020 | Adam | G06F 21/57 |

FOREIGN PATENT DOCUMENTS

| | | | | |
|---|---|---|---|---|
| EP | 3062446 | A1 * | 8/2016 | H04B 1/10 |
| WO | WO-03036504 | A1 * | 5/2003 | H04L 29/06027 |
| WO | WO-2012036939 | A2 * | 3/2012 | G06F 11/3495 |
| WO | WO-2016137529 | A1 * | 9/2016 | H04W 16/18 |
| WO | 2019092476 | A1 | 5/2019 | |

* cited by examiner

| Call direction | BSS load | AMR codec | Country | Call type | LAN status | AP OUI | IPsec use | TCP use | Network | Call drop rate | Total # of devices |
|---|---|---|---|---|---|---|---|---|---|---|---|
| mobile terminated | 0 | 2 | CID 15 | normal | true | APID 23 | true | false | NID 15-2 | 25.525% | 12982 |

| Device model | Baseband version | Country | Network | Roaming | Reason for FAIL | RAT | Latitude | Longitude | Bandwidth CA combination | FAIL count |
|---|---|---|---|---|---|---|---|---|---|---|
| M 10 | BB 10 | CID 13 | NID 13-5 | false | ERR# 23 | LTE | LaNUM | LoNUM | 10 MHz + 10 MHz | 36609 |
| M 10 | BB 10 | CID 13 | NID 13-5 | false | ERR# 25 | LTE | LaNUM | LoNUM | 10 MHz + 10 MHz | 36507 |
| M 10 | BB 08 | CID 13 | NID 13-5 | false | ERR# 25 | LTE | LaNUM | LoNUM | 10 MHz + 10 MHz | 23572 |

*FIG. 13*

| Specific provider cell ID | Device model | Technology | Call setup direction | Frequency band | Total number of calls | Call setup failure rate |
|---|---|---|---|---|---|---|
| CPCID 45 | M 10 | WCDMA | Mobile terminated (MT) | WCDMA_2000 | 9980 | 99.8% |
| CPCID 47 | M 08 | WCDMA | Mobile terminated (MT) | WCDMA_900 | 7169 | 99.3% |

1502

*Almost 100% of the Received Calls are Failing in these conditions*

*FIG. 15*

SELF-ORGANIZING DEVICE

PRIORITY CLAIM

This application claims benefit of priority of U.S. Provisional Patent Application Ser. No. 62/849,022 titled "Self-Organizing Device", filed on May 16, 2019, which is hereby incorporated by reference as though fully and completely set forth herein.

FIELD OF THE INVENTION

The present application relates to wireless communications, and more particularly to a self-organizing device for use in wireless communications, e.g. in 3GPP LTE and/or 5G/NR communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH', etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR aims to provide a higher capacity for a higher density of mobile broadband users, support of device-to-device, ultra-reliable, and massive machine communications, and lower latency and lower battery consumption than current LTE standards.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. The UEs, which may be mobile telephones or smart phones, portable gaming devices, laptops, wearable devices, PDAs, tablets, portable Internet devices, music players, data storage devices, or other handheld devices, etc. may have multiple radio interfaces that enable support of multiple radio access technologies (RATs) as defined by the various wireless communication standards (LTE, LTE-A, Wi-Fi, BLUETOOTH', etc.). The radio interfaces may be used by various applications and the presence of the multiple radio interfaces may necessitate the UE to implement mobility solutions to seamlessly run applications simultaneously over multiple radio interfaces (e.g., over LTE and/or LTE-A and BLUETOOTH®) without impacting the end-to-end performance of the application. Furthermore, a UE oftentimes implements an algorithm and/or policy for switching between the various wireless interfaces for certain applications, e.g. for streaming data, or for conducting audio and/or voice calls. For example, VoLTE allows UEs to conduct audio calls over LTE in addition to also having the ability to conduct voice calls over a circuit switched (CS) network.

In order to improve wireless communications, the concept of a self-organizing network (SON) was introduced. SON represents an automation technology intended to facilitate simpler and faster planning, configuration, management, optimization, and healing of mobile radio access networks. The functionality and behavior of SONs has been specified according to various mobile industry recommendations, for example as outlined by standards organizations such as 3GPP (3rd Generation Partnership Project) and NGMN (Next Generation Mobile Networks). SON enables cellular networks to self-optimize their performance based on observed failures. While SON helps address end-to-end performance of wireless networks, it does not address device-specific issues affecting mobile devices. In other words, SON fails to address issues affecting mobile devices when those issues are not exclusively network-specific.

Other related deficiencies of the prior art will become apparent to one skilled in the art after comparing such prior art with the disclosed embodiments as described herein.

SUMMARY OF THE INVENTION

Embodiments are presented herein of, inter alia, of methods and procedures for supporting various devices, e.g. wireless communication devices and (cloud) servers, to leverage crowdsourced data for devising and/or defining and implementing mitigation techniques for improved device operation, enabling mobile devices to operate as self-organizing devices. Embodiments are further presented herein for wireless communication systems containing wireless communication devices (UEs), cloud servers, and/or base stations and access points (APs) communicating with each other within the wireless communication systems according to the various methods and procedures disclosed herein.

As previously mentioned, the concept of self-organizing networks (SON) was introduced as a set of standardized techniques that enables cellular networks to optimize their performance based on observed failures. Some of the key features supported by SON (or in SON) include:

Mobility Robustness Optimization (MRO), which helps address coverage enhancements;

Mobility Load Balancing (MLB) Optimization, which helps address capacity enhancements;

Random Access Procedure (RACH) optimization, which helps optimize call setup delays, data resuming delays from the uplink (UL) unsynchronized state, handover delays, etc.; and Automatic or Automated Neighbor Relations (ANR) optimization, which automates the maintenance of a neighbor relation (NR) list, a task which, prior to the introduction of SON, needed to be performed manually.

While SON helps address the end-to-end performance of wireless networks, it fails to address device specific issues that are not exclusively network related. For example, SON fails to provide support for a mechanism that can change the Wi-Fi calling policies for a specific device (e.g. for a device associated with a specific user) based on detection of poor coverage and call failure rates for that specific device. SON also fails to provide a mechanism for recovering from baseband failure and/or the device remaining in a poor coverage area, and cannot be used to dynamically install software patches to address a device specific issue without providing over the air (OTA) updates (e.g. global software updates) to be installed by all devices. In general, even when configured for each carrier on a macro level, mechanisms and operating policies might not provide desirable results, e.g. results meeting certain previously determined performance standards and/or expectations. It may be beneficial to adjust and/or modify these calling policies and mechanisms to accommodate updates for individual devices, based on the behavior of other devices, e.g. based on issues experienced by other devices similar to the device to be updated.

Therefore, to improve device operation, self-organizing principles may be implemented in devices, for example in mobile devices such as devices associated with specific users. Accordingly, devices may be designed to operate as self-organizing devices. Such self-organizing devices (SODs) may include a centralized "listener" module, or recovery control module (RCM), which may monitor different events from various different operating domains associated with wireless communications of the device, for example from different layers of a software stack, and based on the information gathered as a result of the monitoring, execute an auto-recovery mechanism when applicable. The devices may provide the monitored information to servers, e.g. to cloud servers, which may use expert systems to analyze information collected from multiple devices, in many cases information collected from globally dispersed devices, and devise and/or define mitigation action responses corresponding to specific scenarios or conditions that include device-specific considerations. The mitigating action responses may be provided to the devices by the servers (e.g. from cloud containers) as expert system rules in the form of uncompiled code that the devices may use to implement the necessary mitigation actions as warranted. The RCM of the SOD may compare monitored scenarios and/or conditions to previously identified scenarios and/or conditions, and may determine if a corresponding mitigation action, e.g. a mitigation action corresponding to the identified scenario and/or condition, exists. Responsive to identifying that such a mitigation action is available, the device may perform the mitigation action, thereby improving operation of the device. In this manner, crowdsourced information, e.g. from globally dispersed devices, may be leveraged and/or used to devise mitigation actions tailored to specific conditions and/or scenarios, e.g. conditions that may be specific to certain devices, without requiring global software updates.

In some embodiments, devices (e.g. mobile devices) may periodically query a server (e.g. cloud server) to access up-to-date expert system rules. That is, the devices may periodically query one or more servers or check with the one or more servers—e.g. to query or check cloud containers that store expert system rules which include a list of conditions and corresponding mitigating actions—to retrieve updated expert system rules or update the expert system rules on the device as applicable. This provides flexibility for the devices to adapt to changing conditions in the field of operation. Expert system rules transmitted to the devices may thus be automatically and/or dynamically changed and updated as crowdsourced data changes and/or accumulates. Pursuant to this strategy, devices may operate according to an "explore vs. exploit" methodology. A certain number of the devices, e.g. a certain percentage of the devices, may keep executing mitigations (mitigation actions) received from the server (e.g. from an expert system and/or cloud container in the server). Such devices may be considered "exploiting devices". The remaining devices may in turn operate in a "no-mitigation" mode, not performing the mitigation actions but instead collecting up-to-date data points, e.g. current or present data points, from the field of operation to transmit to the server(s) to better reflect present operating conditions. Such devices may be considered "exploring devices". In some embodiments, a device may be both an exploiting device as well as an exploring device.

In certain scenarios where multiple mitigation actions are possible, the server may provide various different mitigation (action) options corresponding to the same scenario and/or conditions (e.g. corresponding to the same anomaly) to different devices or groups of devices, establishing a feedback loop for devices to apply different mitigations and/or mitigation actions, and transmit information indicative of the respective results of the mitigations and/or mitigation actions (e.g. succeeded vs. failed) back to the server. Based on this feedback loop, a best (e.g. winning) mitigation action or mitigation actions corresponding to a given condition and/or anomaly may be established and selected as the mitigation and/or mitigation action to be applied by the devices at large (e.g. globally) for the corresponding condition and/or anomaly type.

Pursuant to the above, in some embodiments, a device may monitor first wireless diagnostic information that includes respective information corresponding to different operating domains associated with wireless communications of a device, for example corresponding to different layers of a software stack associated with wireless communications of the device. The device may identify an operating condition presently experienced by the device, based on the monitored diagnostic information, and may in response perform a mitigation action corresponding to the operating condition, with the mitigation action alleviating or eliminating adverse effects of the operating condition experienced by the device. The device may receive the mitigation action in the form of code that the device may use to implement the mitigation action. In some embodiments the code may include uncompiled code, while in some embodiments the code may include binary code usable by the device to hot patch the device, for example by hot patching the operating system of the device.

In some embodiments, a server, e.g. a cloud server may analyze crowdsourced wireless diagnostic information received from a number of dispersed devices, for example from globally dispersed devices. The crowdsourced wireless diagnostic information may include device-specific information corresponding to the dispersed (or globally dispersed) devices. The server may identify a specific operating condition based on the analysis of the crowdsourced wireless diagnostic information, and may define one or more mitigation actions corresponding to the operating condition. In case more than one mitigation action is defined, the server may transmit information representative of a different mitigation action to a different respective set of devices for each different mitigation action. The server may receive respective results corresponding to each different mitigation action having been performed, and may analyze the respective results. The server may then select one mitigation action from among the one more mitigation actions as a preferred mitigation action, based on the analysis of the respective results. The server may transmit the preferred mitigation action to a subset of the dispersed devices that includes devices that have been affected by the operating condition.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 11 shows a selected row of an exemplary table that stores operating-condition information for use in devising mitigation action(s) for dynamic Wi-Fi calling policy for a self-organizing device, according to some embodiments;

FIG. 13 shows selected rows of an exemplary table that stores operating-condition information for use in devising mitigation action(s) for radio access technology and carrier aggregation based modem stability, according to some embodiments;

FIG. 15 shows selected rows of an exemplary table that stores operating-condition information for use in devising mitigation action(s) for cell barring based on anomaly signatures, according to some embodiments;

Figure 1:
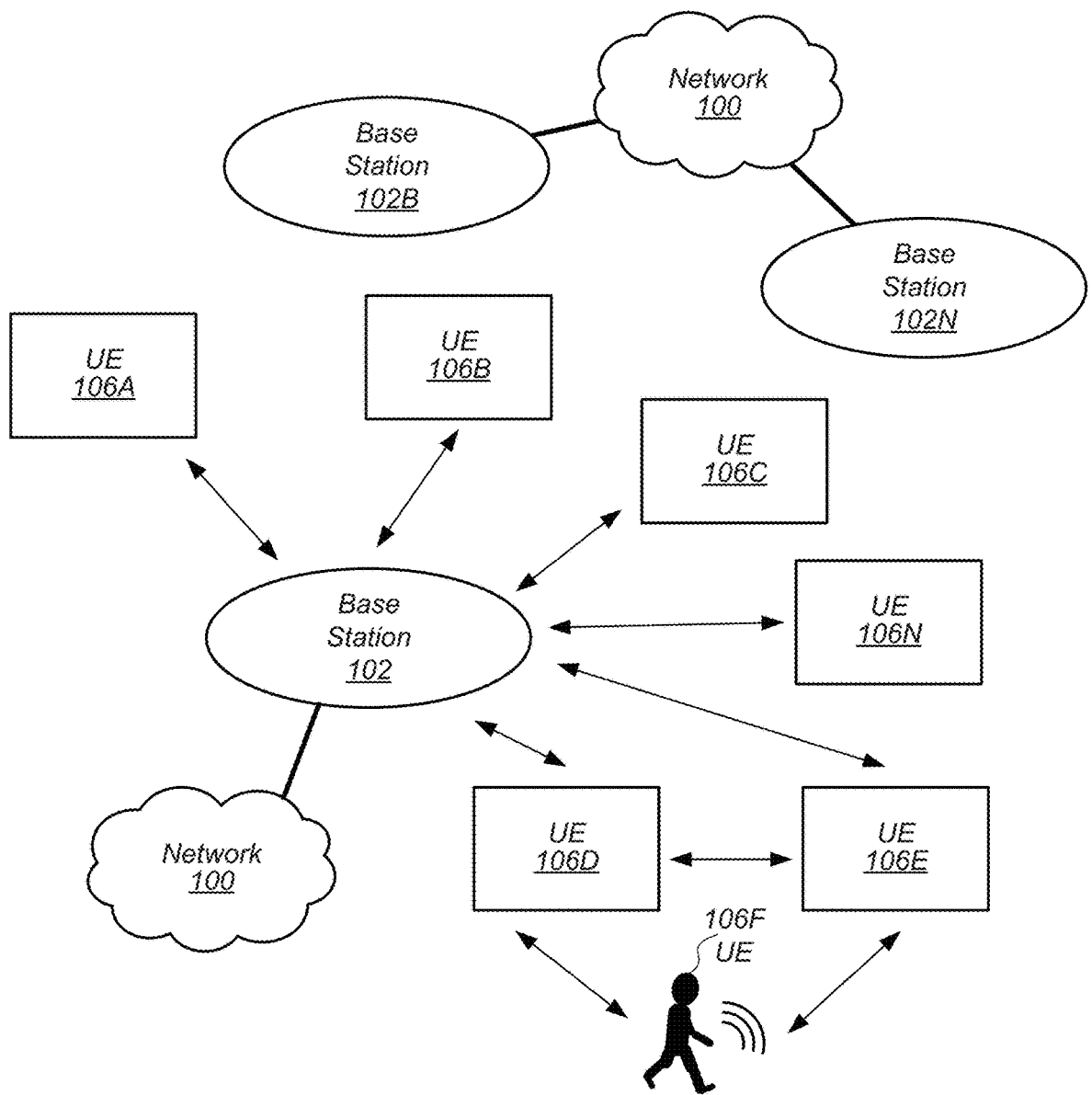
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
BS: Base Station
BSR: Buffer Size Report
BSS: Basic Service Set
CBRS: Citizens Broadband Radio Service
CBSD: Citizens Broadband Radio Service Device
CCA: Clear Channel Assessment
CID: Country Identifier
CMR: Change Mode Request
CS: Circuit Switched
DL: Downlink (from BS to UE)
DSDS: Dual SIM Dual Standby
DYN: Dynamic
EDCF: Enhanced Distributed Coordination Function
ETL: Extract, Transform, Load
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IPsec: Internet Protocol Security
IR: Initialization and Refresh state
KPI: Key Performance Indicator
LAN: Local Area Network
LBT: Listen Before Talk
LQM: Link Quality Metric
LTE: Long Term Evolution
MNO: Mobile Network Operator
MT: Mobile Terminated
NB: Narrowband
NID: Network Identifier
OOS: Out of Sync
OUI: Organizational Unit Identifier PAL: Priority Access Licensee
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PT: Payload Type
QBSS: Quality of Service Enhanced Basic Service Set
QI: Quality Indicator
RAT: Radio Access Technology
RF: Radio Frequency
ROHC: Robust Header Compression
RTP: Real-time Transport Protocol
RTT: Round Trip Time
RX: Reception/Receive
SAS: Spectrum Allocation Server
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TX: Transmission/Transmit
UE: User Equipment
UL: Uplink (from UE to BS)
UMTS: Universal Mobile Telecommunication System
USIM: UMTS Subscriber Identity Module
WB: Wideband
WD: Wireless Diagnostic
Wi-Fi: Wireless Local Area Network (WLAN) RAT based on the Institute of Electrical and Electronics Engineers' (IEEE) 802.11 standards
WLAN: Wireless LAN
Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™™, Android™-based phones) and tablet computers such as iPad™, Samsung Galaxy™, etc., gaming devices (e.g. Sony PlayStation™, Microsoft Xbox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable and/or mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Camping on a Network and/or Cell—refers to device, e.g. a mobile device (UE) having completed the network and/or cell selection and/or reselection process and chosen a network and/or cell. As part of being camped on the network and/or cell, the UE may monitor system information and (in most cases) paging information on that network and/or cell.

Barring a Network and/or Cell—refers to a network and/or cell that a given mobile device is not allowed to camp on. In some situations a specific network and/or cell may be barred for a given device (e.g., the device itself may bar the specific network and/or cell). The barring may be for a specified time duration or for a time period of specified duration, which means that the device will not be allowed to camp on the specific network and/or cell for at least the specified time duration and/or time period of specified duration from the point in time at which the specific network and/or cell is barred.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Expert System—refers to various systems which use artificial intelligence techniques and databases of expert knowledge to provide information used in decision making. Typically, an expert system may incorporate a knowledge base containing accumulated experience and an inference or rules engine which defines a set of rules for applying the knowledge base to each particular situation that is described to the system. The system's capabilities may be enhanced with additions to the knowledge base or to the set of rules. Expert systems may include machine learning capabilities that allow them to improve their performance based on experience, similar to human learning.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In cellular radio communications, signal and data transmissions may be organized according to designated time units of specific duration during which transmissions take place. For example, in LTE, transmissions are divided into radio frames, each radio frame being of equal (time) duration (e.g. each radio frame may be 10 ms). A radio frame in LTE may be further divided into ten subframes, each subframe being of equal duration, with the subframes designated as the smallest (minimum) scheduling unit, or the designated time unit for a transmission. Similarly, a smallest (or minimum) scheduling unit for 5G NR (or NR, for short) transmissions is referred to as a slot. Accordingly, as used herein, the term "slot" is used to reference a smallest (or minimum) scheduling time unit for the wireless communications being described for NR communications. However, as noted above, in different communication protocols such a scheduling time unit may be named differently, e.g. it is named "subframe" in LTE, etc.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
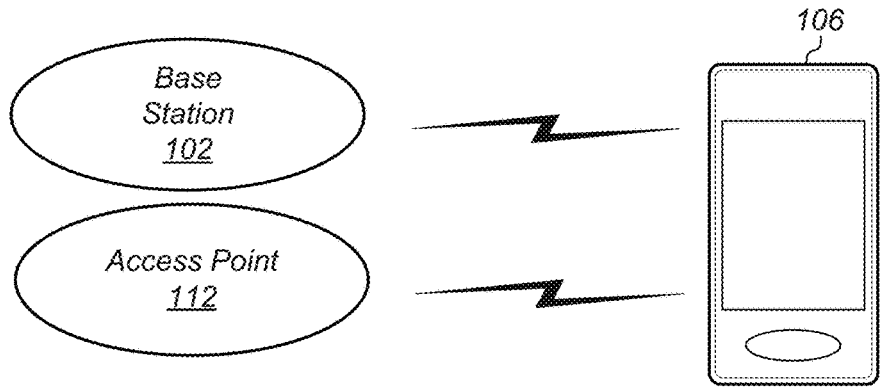
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106 are referred to as UEs or UE devices. Various ones of the UE devices may operate to implement mitigation actions responsive to encountering specific operating conditions taking into account device-specific considerations, according to various embodiments disclosed herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, neutral host or various CBRS deployments, among various possibilities). Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102 is implemented in the context of LTE, it may alternately be referred to as an eNodeB' or eNB'. Note that if the base station 102 is implemented in the context of 5G NR, it may alternately be referred to as 'gNodeB' or 'gNB'. In some embodiments, the base station 102 (e.g. an eNB in an LTE network or a gNB in an NR network) may communicate with at least one UE having the capability to implement mitigation actions responsive to encountering specific operating conditions taking into account device-specific considerations, as described herein. Depending on a given application or specific considerations, for convenience some of the various different RATs may be functionally grouped according to an overall defining characteristic. For example, all cellular RATs may be collectively considered as representative of a first (form and/or type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications and/or embodiments under consideration.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services. UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations (such as base stations 102B . . . 102N) operating according to the same or a different cellular communication standard may thus be provided as one or more networks of cells, which may provide continuous or nearly continuous overlapping service to UE 106 and similar devices over a wide geographic area via one or more cellular communication standards.

Thus, while base station 102 may act as a "serving cell" for UEs 106A-106N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102 and 102B illustrated in FIG. 1 might be macro cells, while base station 102N might be a micro cell. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE 106 communicating with one or more network nodes considered to be a part of the network and which may interact with the UE 106 to conduct communications with the UE 106 and in some cases affect at least some of the communication parameters and/or use of communication resources of the UE 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Various aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106A through 106N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include radio circuitries for communicating using either of LTE or CDMA2000 1×RTT or NR, and/or communicating using each of Wi-Fi and BLUETOOTH™. Other configurations are also possible.

Figure 3:
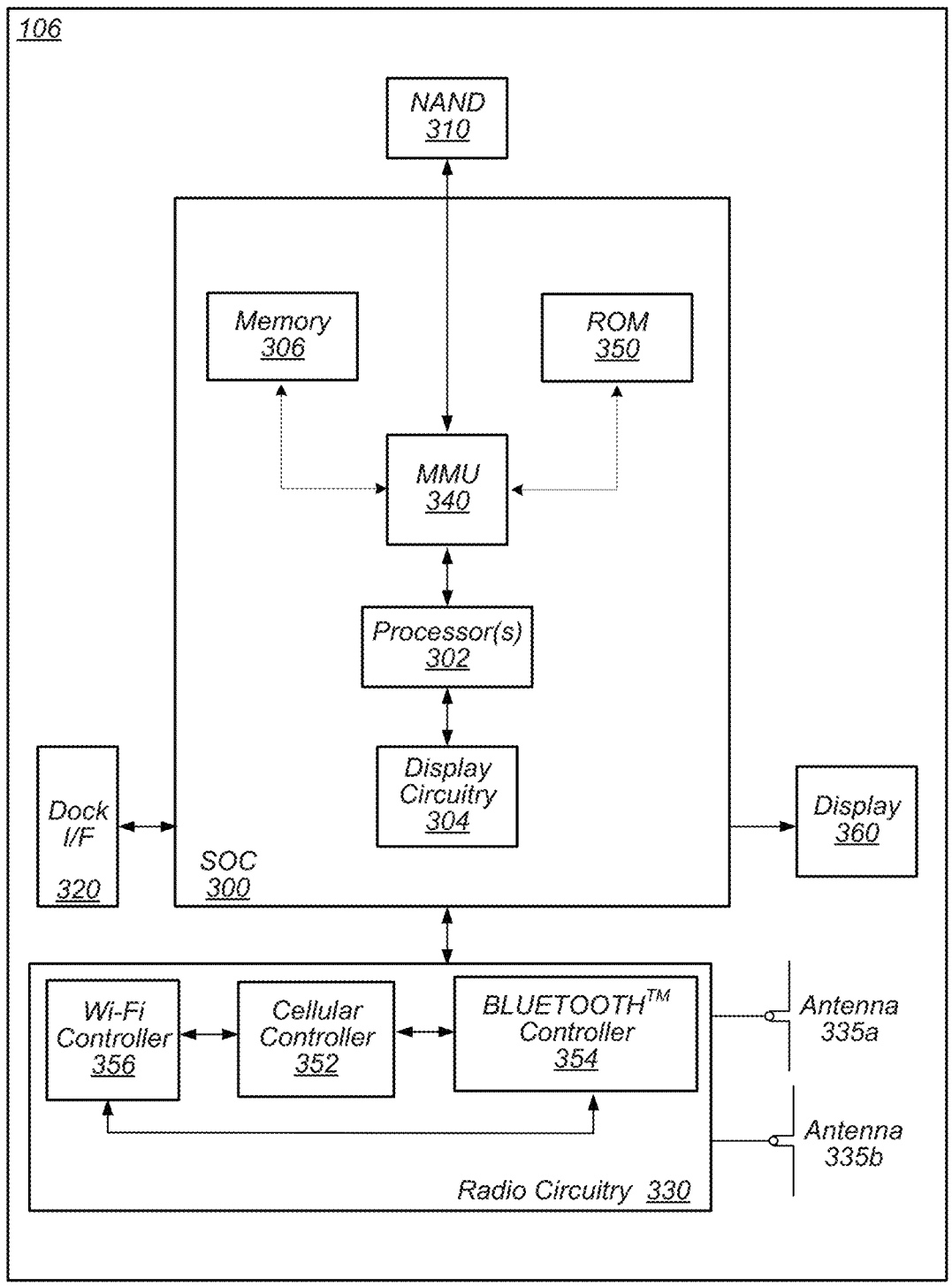
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 may include hardware and software components for implementing methods for at least UE 106 to implement mitigation actions responsive to encountering specific operating conditions taking into account device-specific considerations, as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate performing mitigation actions responsive to encountering specific operating conditions taking into account device-specific considerations according to various embodiments disclosed herein. Processor(s) 302 may also implement various other applications and/or end-user applications running on UE 106.

Figure 5:
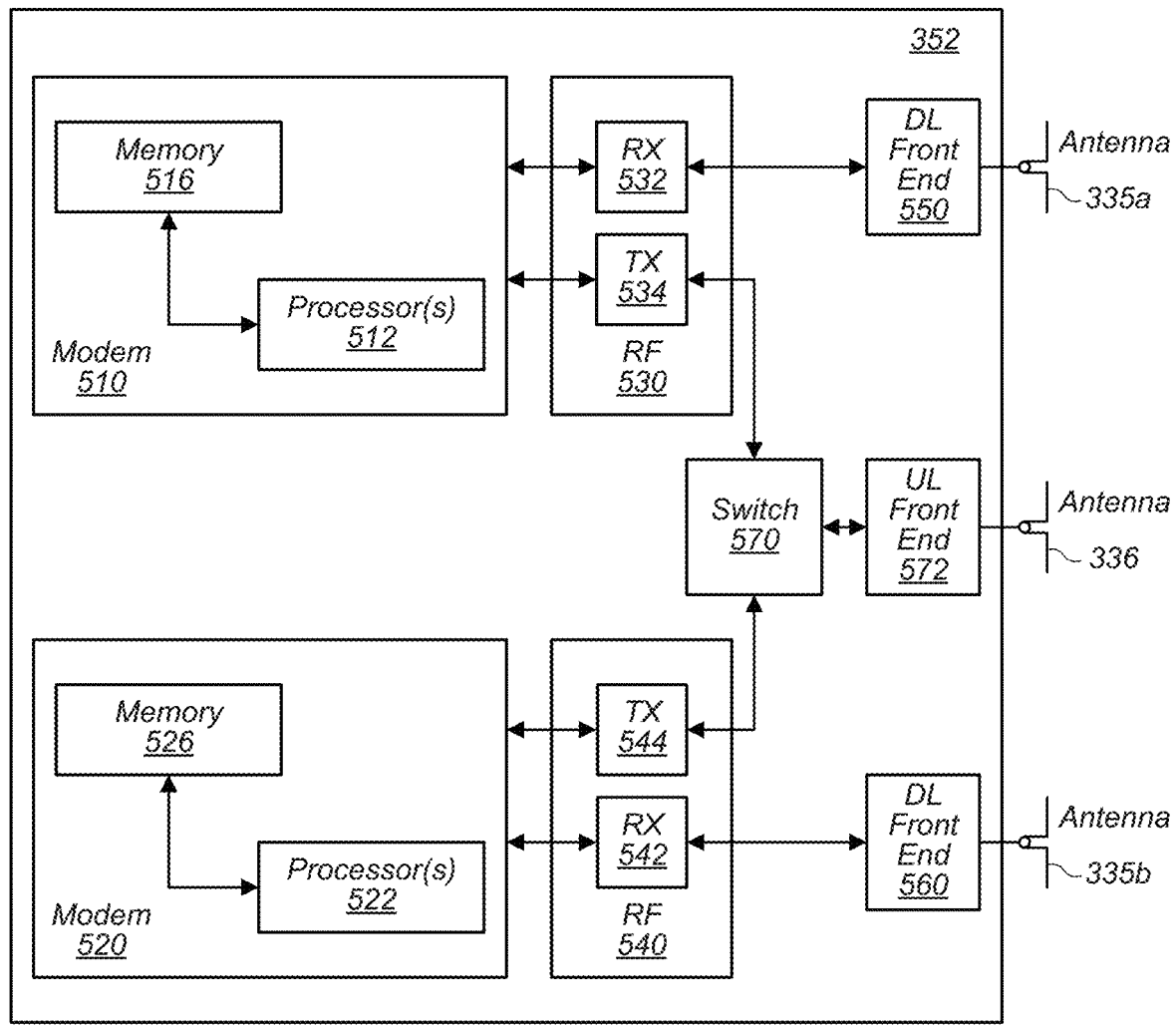
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (Ics or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 and will be described later.

Figure 4:
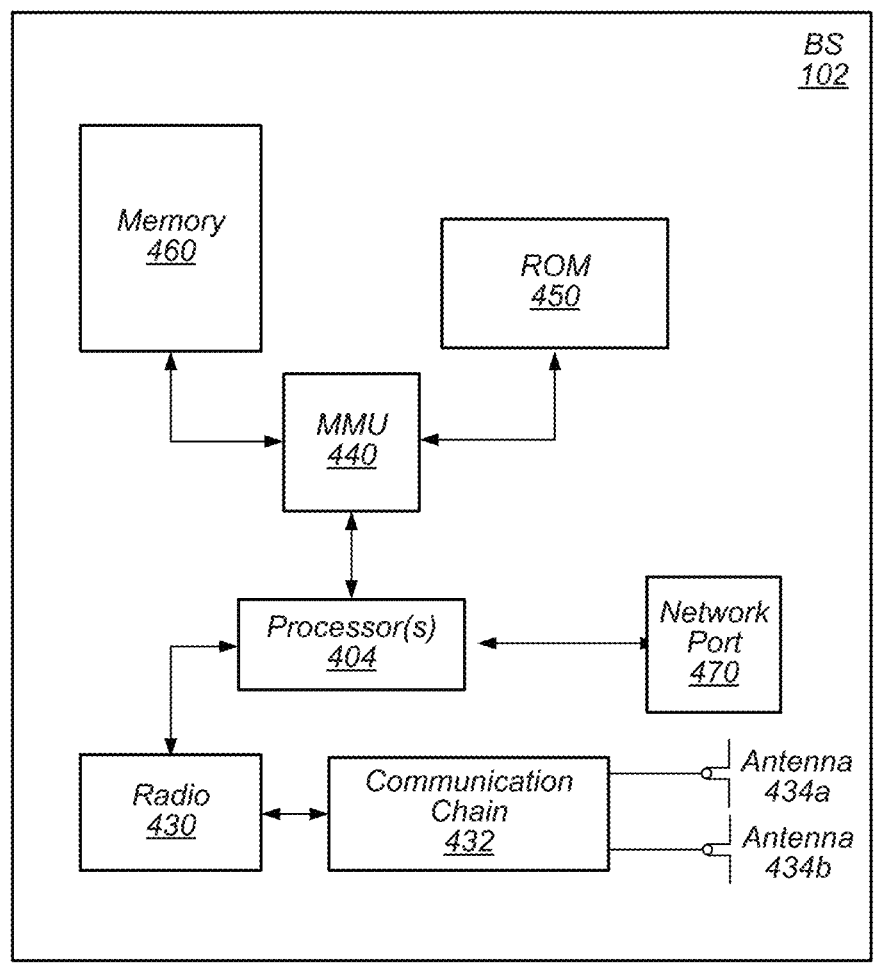
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434a, and possibly multiple antennas (e.g. illustrated by antennas 434a and 434b), for performing wireless communication with mobile devices and/or other devices. Antennas 434a and 434b are shown by way of example, and base station 102 may include fewer or more antennas. Overall, the one or more antennas are collectively referred to as antenna(s) 434. Antenna(s) 434 may be configured to operate as a wireless transceiver and may be further configured to communicate with UE devices 106 via radio circuitry 430. The antenna(s) 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (NR) WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device capable of implementing mitigation actions responsive to encountering specific operating conditions taking into account device-specific considerations. Alternatively, the processor(s) 404 may be configured as a programmable hardware element(s), such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices capable of performing mitigation actions responsive to encountering specific operating conditions taking into account device-specific considerations, according to various embodiments described herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (Ics) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit and/or receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Figure 6:
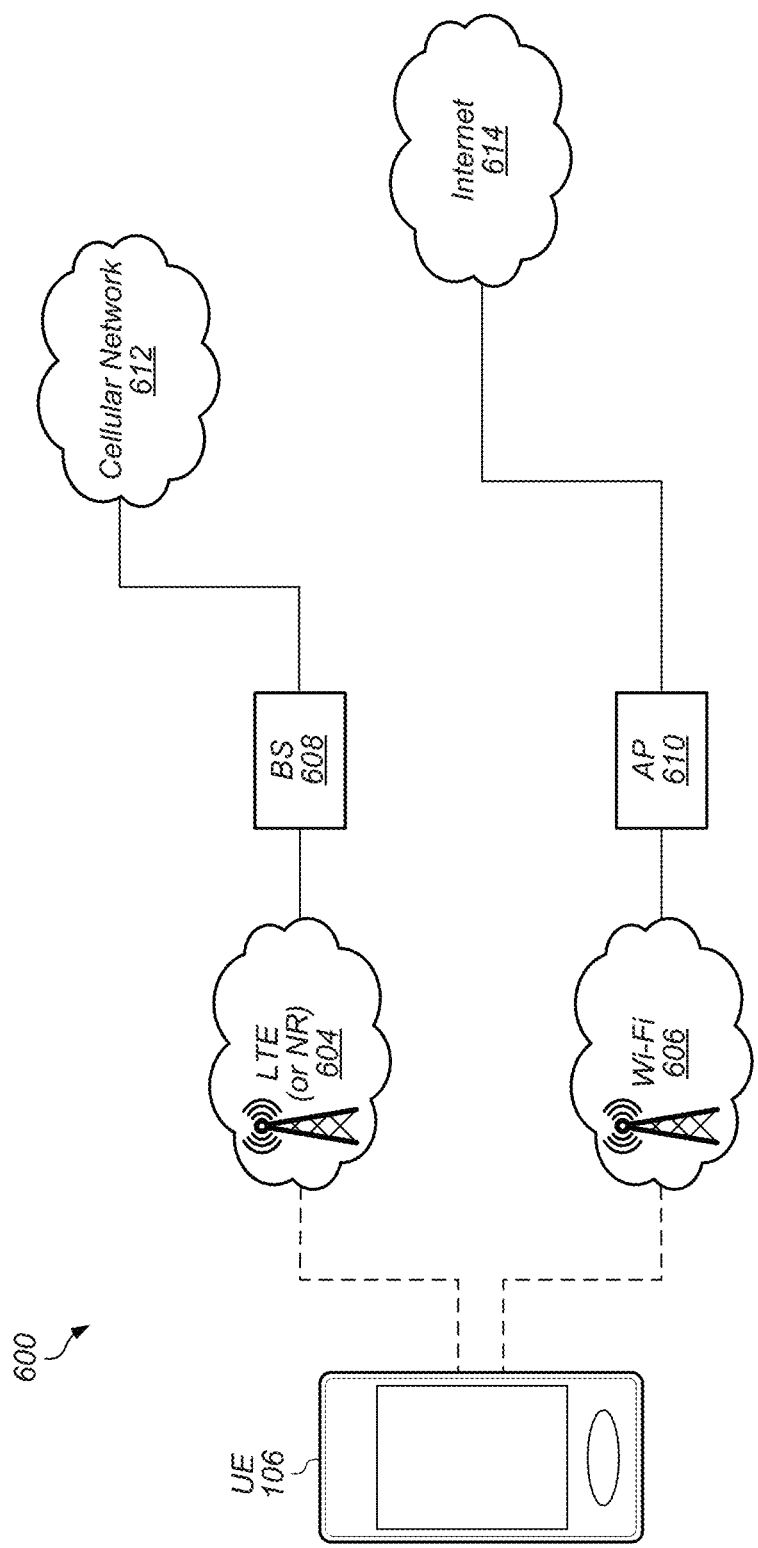
FIG. 6 illustrates an exemplary wireless communication system providing cellular and Wi-Fi coverage, according to some embodiments.

FIG. 6—Exemplary Communication System

FIG. 6 illustrates an exemplary wireless communication system 600 in which a device may communicate according to multiple radio access technologies (RATs) using different respective radio circuits for each RAT. System 600 is a system in which an LTE (or NR) access network and a Wi-Fi radio access network are implemented. The system 500 may include UE 106 and LTE (or NR) network 604 and Wi-Fi network 606.

LTE (or NR) access network 604 is representative of some embodiments of a first RAT access and Wi-Fi access network 606 is representative of some embodiments of a second RAT access. LTE (or NR) access network 604 may be interfaced with a broader cellular network (e.g. LTE or NR) and Wi-Fi access network 606 may be interfaced with the Internet 614. More particularly, LTE (or NR) access network 504 may be interfaced with a serving base station (BS) 608, which may in turn provide access to broader cellular network 616. The Wi-Fi access network 606 may be interfaced with an access point (AP) 610, which may in turn provide access to the Internet 614. UE 106 may accordingly access Internet 614 via AP 610 and may access cellular network 616 via LTE access network 604. In some embodiments, not shown, UE 106 may also access Internet 614 via LTE (or NR) access network 604. More specifically, LTE (or NR) access network 604 may be interfaced with a serving gateway, which may in turn be interfaced with a packet data network (PDN) gateway. The PDN gateway may, in turn, be interfaced with Internet 604. UE 106 may accordingly access Internet 614 via either or both of LTE (or NR) access network 604 and Wi-Fi access network 606. In interfacing with Internet 614, UE 106 may be interfacing with a variety of devices also interfacing with Internet 614, for example servers, such as cloud servers, among others. Accordingly, UE 106 may conduct various communications, e.g. data transfers or audio voice calls, via either or both of LTE (or NR) access network 604 and Wi-Fi access network 606. Furthermore, while FIG. 6 shows an LTE (or NR) access network, other cellular networks (not shown, e.g. a CBRS network) may equally be accessed by UE 106 in a manner similar to accessing LTE (or NR) access network 604.

Self-Organizing Networks

As previously indicated, Self-Organizing Network (SON) is an automation technology designed to make the planning, configuration, management, optimization and failure recovery of mobile radio access networks simpler and faster. SON functionality and behavior has been defined and specified in generally accepted mobile industry recommendations produced by organizations such as 3GPP (3$^{rd}$ Generation Partnership Project) and the NGMN (Next Generation Mobile Networks). SON technology features were first deployed in Long Term Evolution (LTE) networks, but the technology has also been retro-fitted to older radio access technologies such as Universal Mobile Telecommunications System (UMTS). For example, the LTE specification inherently supports SON features like Automatic Neighbor Relation (ANR) detection. Newly added base stations are self-configured in line with a "plug-and-play" paradigm while all operational base stations regularly self-optimize parameters and algorithmic behavior in response to observed network performance and radio conditions. Furthermore, self-healing mechanisms may be triggered to temporarily compensate for a detected equipment outage, while awaiting a more permanent solution. SON architectural types include distributed, centralized and hybrid. In addition, self-organizing network functionalities are commonly divided into three major sub-functional groups, each containing a wide range of decomposed use cases. These groups include self-configuration functions, self-optimization functions, and self-healing functions.

Self-configuration involves the automatic configuration of new base stations and their integration into the network, with connectivity establishment and download of configuration parameters implemented in software. Self-configuration is typically supplied as part of the software delivery with each radio cell by equipment vendors. When a new base station is introduced into the network and powered on, it may be immediately recognized and registered by the network, and neighboring base stations may automatically adjust their technical parameters (such as emission power, antenna tilt, etc.) in order to provide the required coverage and capacity, and avoid the interference.

Base stations may be implemented with configuration parameters that control various aspects of the cell site. Each of these parameters may then be altered to change network behavior, based on observations of both the base station itself and measurements at mobile stations or handsets. One SON feature, for example, establishes automatic neighbor relations (ANR) while others optimize random access parameters or mobility robustness in terms of handover oscillations. ANR automatically generates relations between radio network entities, which may be required for features such as active-mode mobility, load balancing and dual connectivity. One use case of self-optimization functions is the automatic deactivation of a certain percentage of cell nodes (e.g. base stations) during non-peak, e.g. night, operating hours to obtain significant energy savings for service operators. Neighboring base stations may reconfigure their parameters in order to provide coverage for the entire signal area. In case of a sudden growth in connectivity demand, deactivated base stations may be almost instantaneously reactivated.

When some nodes in the network become inoperative, self-healing mechanisms may reduce the failure impact, for example by adjusting parameters and algorithms in adjacent cells to facilitate support by the adjacent cells to the users previously supported by the failing node. In legacy networks, failing base stations may be hard to identify, and may require a significant amount of time and resources to fix. The self-healing function of SON provides for almost immediate identification of failing base stations and the implementation of measures that ensure no degradation (or insignificant degradation) of service for the users.

Self-Organizing Devices

While SON functionality boosts wireless network performance, e.g. end-to-end performance of wireless networks, it doesn't provide any mechanisms or remedies for device failures that include one or more issues specific to the device itself. However, the network itself collects data from different nodes and different layers of the network infrastructure and adjusts its operation based on the observed failures. While no similar process exists for devices, it is possible to configure the devices to also perform pattern matching and adjust their operation based on the anomalies identified by a larger group of devices, or a greater device population that includes a number of devices (anywhere from a small device population to a large device population). For example, if a certain number of devices encounter an issue or experience a similar failure, additional devices may avoid similar or identical failures by receiving and leveraging information indicative and/or pertaining to those failures. In order to achieve this, servers may collect data from devices, identify global trends and local anomalies, and based on those trends and local anomalies establish expert system rules that may be communicated back to other devices. Responsive to receiving such information, upon encountering a similar or identical anomaly the device may recover from or mitigate the problem. In this manner, at least some of the principles of SON may be extended to mobile devices, e.g. devices associated with specific users, to allow those devices to operate as self-organizing devices.

Self-organizing devices (SODs), which may be devices such as device 106 illustrated in at least FIGS. 1-3 and 6, may include a "symptoms" module or recovery control module (RCM), for monitoring events from various different operating domains, for example from different software (SW) layers or different layers of the SW stack, and execute an auto-recovery mechanism based on the gathered information as warranted. The SODs may provide the monitored information to servers, e.g. to cloud servers, which may use expert systems analysis of the information collected from multiple devices, e.g. from globally dispersed devices, and devise mitigation action response strategies corresponding to specific scenarios or conditions that include device-specific considerations. In contrast to SONs, these scenarios and/or conditions account for device-specific issues, for example issues that may be specific to certain devices or groups of devices as determined from the analysis of the crowdsourced data and/or information. Mitigating action responses devised by the expert systems, for example in the servers, may then be provided to the devices by the servers (e.g. from cloud containers in the servers) as expert system rules in the form of uncompiled code that the devices may use to implement the necessary mitigation actions as needed. The RCM of the SOD may compare monitored scenarios and/or conditions to previously identified scenarios and/or conditions, and may determine whether a corresponding mitigation action, e.g. a mitigation action corresponding to the identified scenario and/or condition, is available. Responsive to determining that such a mitigation action is available and having identified that mitigation action, the device may perform the mitigation action, thereby improving operation of the device. Thus, crowdsourced information, e.g. information collected from dispersed devices, for example from globally dispersed devices, may be leveraged and used for devising mitigation actions tailored to specific conditions and/or scenarios, e.g. conditions that may be specific to certain devices, without requiring global software updates. It should be noted that embodiments in which the device itself may employ expert system analysis to determine a mitigation action pertaining to that device are also possible and are contemplated.

Accordingly, in some embodiments, a SOD may support the monitoring of failures on a specific device and auto-run recovery mechanism to address device specific issues. The recovery mechanism may include, but is not limited to, one or more of a combination of airplane-mode toggle, baseband operating mode changes, cell barring based on certain signatures, change of Wi-Fi calling policies based on per-device anomalies (a Wi-Fi calling policy specifies whether the device favors Wi-Fi calls or cellular calls under certain radio conditions), adjustment of system selection preferences and device capability messages to recover from and/or avoid service interruption and/or limited service caused at least in part by modem stability issues, reset of certain modules in the SW stack to recover from anomalies (e.g. data stall issues: resetting the TCP stack, application and/or baseband drivers, changing data interfaces), and/or installation of one or more software patches to address device specific issues.

In some embodiments, the SODs may periodically query the server(s) to access up-to-date information pertaining to the tracked conditions and corresponding mitigation actions stored on the server, e.g. according to the conditions and corresponding mitigations identified and/or defined by the expert systems on the server(s). For example, an SOD may periodically check with a server or servers which store the expert system rules that include a list of conditions and corresponding mitigating actions, to retrieve information corresponding to updated expert system rules in order to update the expert system rules on the SOD, as applicable. The SODs may thereby adapt to changing conditions in the field of operation. In this manner, expert system rules transmitted to the SODs may be automatically and/or dynamically changed and updated as the crowdsourced data changes and/or accumulates. The SODs may therefore operate according to an "explore and. Exploit" strategy. Some devices, for example a certain number or percentage of a group of deployed SODs, may execute mitigations (mitigation actions) received from the server, and may thus be considered "exploiting devices". Some devices, for example remaining SODs of the group of deployed SODs may not perform mitigation actions but may instead continue to collect up-to-date, e.g. current data points from the field of operation to transmit to the server(s) to better reflect present operating conditions. Such SODs may be considered "exploring devices". In some embodiments, devices may operate as both an exploring device and an exploiting device depending on a given situation and/or requirements.

FIG. 7

Figure 7:
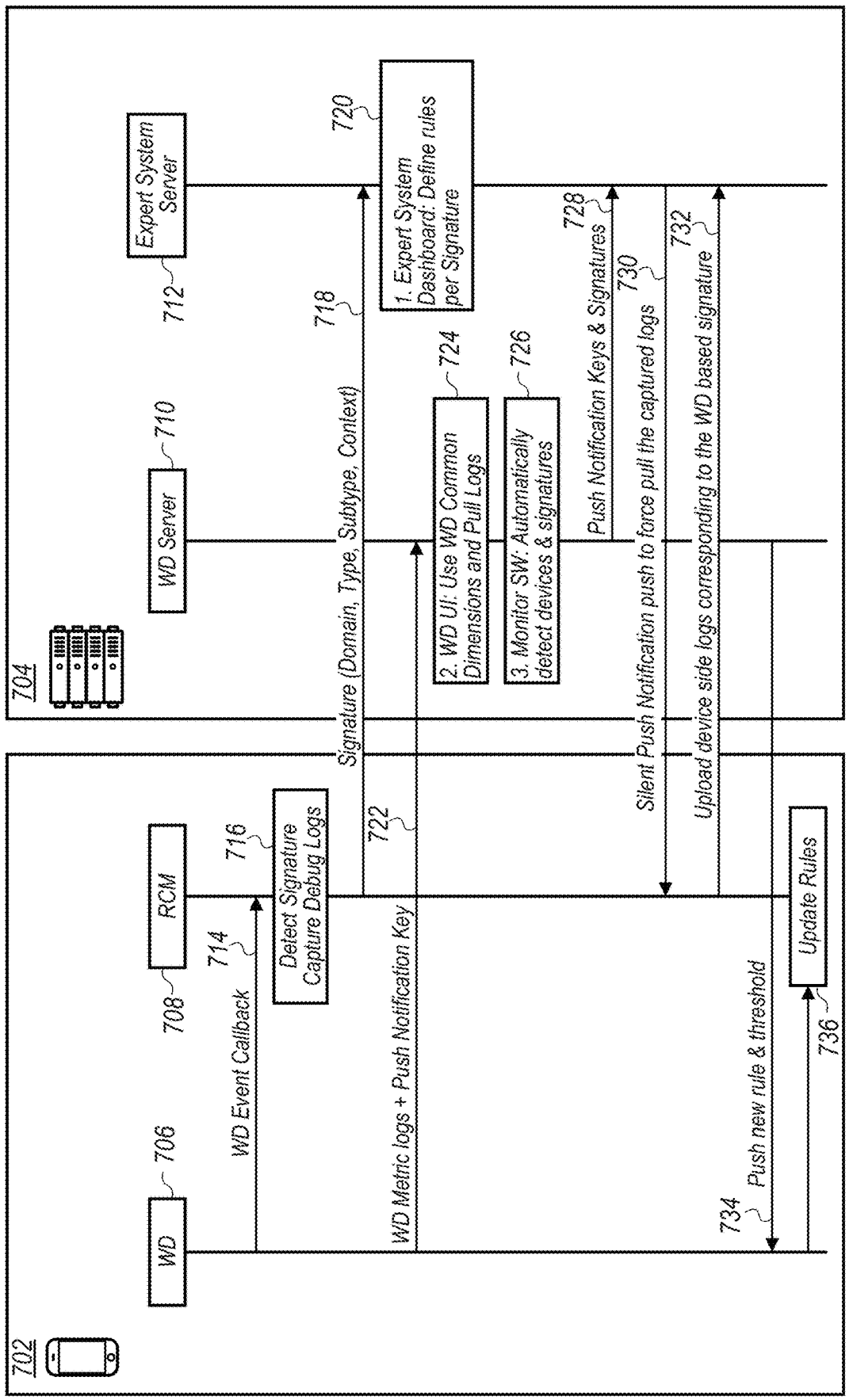
FIG. 7 shows an exemplary flow diagram illustrating device and/or server interaction for implementing and integrating mitigating actions corresponding to specific conditions and/or scenarios that include device specific considerations, according to some embodiments.

FIG. 7 shows an exemplary flow diagram illustrating device and server interaction for implementing and integrating mitigating actions corresponding to specific conditions and/or scenarios that include device specific considerations, according to some embodiments. The flow diagram includes a device component 702 for functions and/or operations performed by the device, and a server component 704 for functions and/or operations performed by a server, e.g. a cloud server. An RCM 708 may be the RCM receiving information from different operating domains, e.g. different SW layers through wireless diagnostics (WD) monitoring 706. Operating domain examples include Wi-Fi, IPSec, baseband, BLUETOOTH™, mobility, motion sensors, etc. The WD information may be provided to RCM 708 via a WD event callback (714). RCM 708 may detect specific event signatures and capture debug logs (716), and may provide the event signatures (or information corresponding to a given condition and/or scenario, such as domain, type, subtype, context, etc.) to server 704 for Expert System Server 712 to use (718). WD 706 may also include providing metric logs and a push notification key to server 704 for WD server 710 to use (722). In response to receiving the push notification key, WD server 710 may pull the logs (724), automatically detect devices and signatures (726), and push the notification keys and signatures to Expert System Server 712 (728). Expert system rule(s) may be provided by expert system server 712, based on the information in WD server 710, with the rules defined per signature (720). Expert System Server 712 may send a push notification to RCM 708 to have the captured logs pulled (730), and pull the device side logs corresponding to the WD based signature and uploaded by RCM 708 (732). WD server 710 may push the new rule and threshold to WD 706 within device 702 (734), which may in turn update the rules for RCM 708 to use (736). As shown in FIG. 7, expert system rules may include two parts, detection of signatures or pattern(s) corresponding to specific scenarios and/or conditions, and a mitigation action that may be performed responsive to detecting a certain signature and/or pattern(s). RCM 708 may perform and/or execute the expert system rules. As shown in FIG. 7, server component 704 facilitates dissemination of mitigation and/or action responses to (other) devices. For example, one of the expert system rules may be to enable action(s) according to the mitigation techniques that have been identified. FIG. 7 shows a push notification system but alternate embodiments may employ a device fetch system whereby the device may fetch expert system rules from the cloud container, e.g. from a server(s) 712 operating as part of the cloud. Such a system is illustrated in FIG. 8 as follows.

FIG. 8

Figure 8:
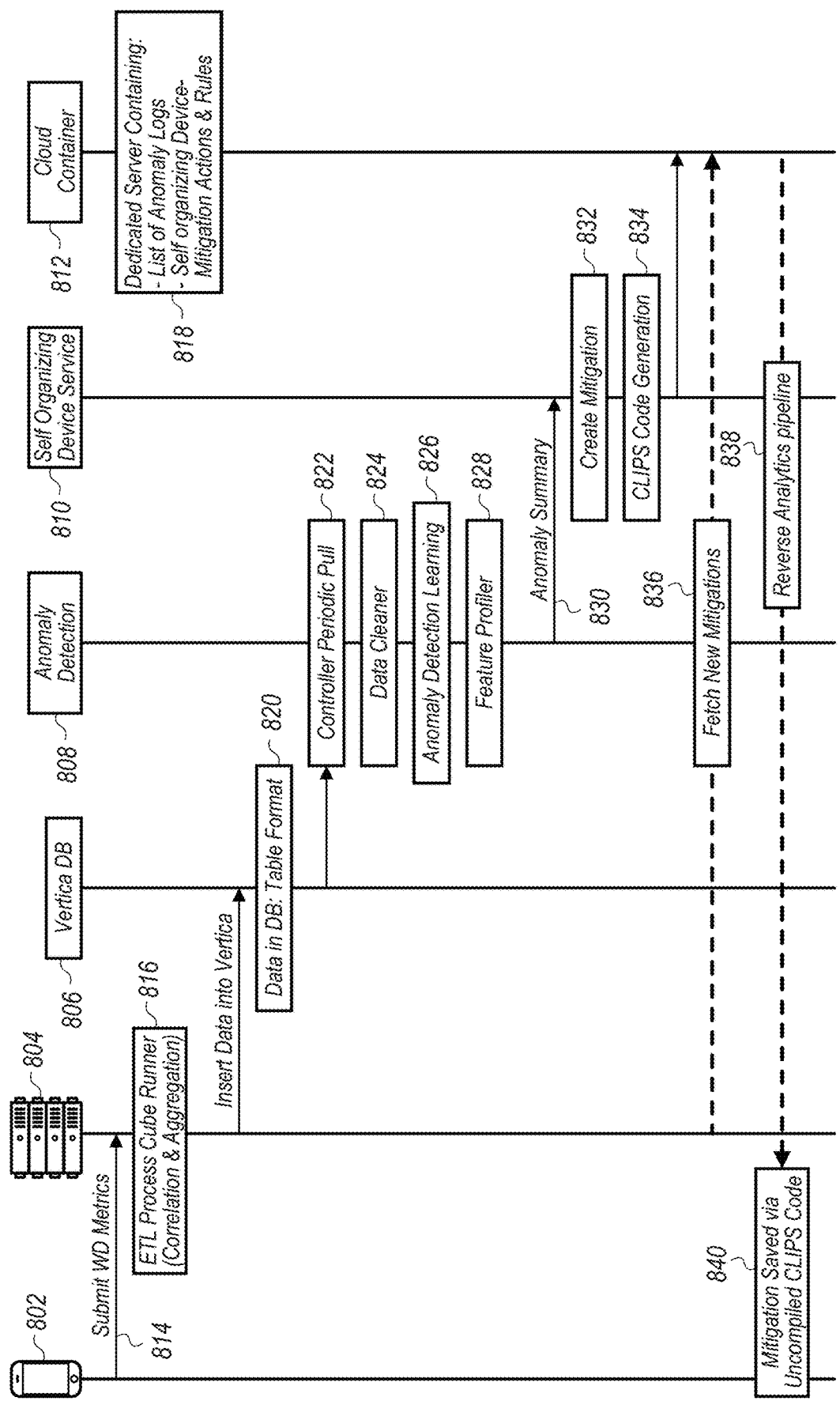
FIG. 8 shows an exemplary flow diagram illustrating a reverse analytics pipeline for a self-organizing device, according to some embodiments.

FIG. 8 shows an exemplary flow diagram illustrating a reverse analytics pipeline for a self-organizing device 802, according to some embodiments. FIG. 8 shows transmission of all data points, wireless diagnostic (WD) metrics, to a server 804 by a device 802 (814). Within server 804, the data may be analyzed. As shown in FIG. 8, the server 804 analyzes the data with the use of Vertica database software 806, which is an analytic database management software. It should be noted that the column-oriented Vertica Analytics Platform was designed to manage large, fast-growing volumes of data and provide very fast query performance when used for data warehouses and other query-intensive applications. Software such as Vertica may be used to improve query performance over traditional relational database systems, and to provide high availability and 33×abyte scalability on commodity enterprise servers. Vertica is infrastructure-independent, supporting deployments on multiple cloud platforms. It is provided in FIG. 8 as an example of efficient data analytics database (software). However, alternative embodiments may use different analytics software.

The server 804 then performs anomaly detections (808) and identifies recovery strategies and/or actions from the anomaly, e.g. how to recover from the anomaly, and based on the anomaly (830) identified by the server 804, a mitigation technique (832) may be defined via self-organizing device service 810. The mitigation technique may be implemented and/or translated to CLIPS code (834), which may then be stored in a dedicated server container (e.g. cloud container 812). Dedicated server container 812 may include a list of anomaly logs, and corresponding self-organizing device mitigation actions and/or rules (818). The device 802 may query the server 804 periodically (e.g. daily), to collect new mitigation actions and/or techniques as applicable (838), at which point the CLIPs code generated at 834 may be provided (among others) to device 802. It should be noted that CLIPS is a public domain software tool for building expert systems. CLIPS stands for "C Language Integrated Production System", and is a widely used expert system tool that incorporates a complete object-oriented language (COOL) for writing expert systems. COOL combines the programming paradigms of procedural, object oriented and logical (theorem proving) languages. CLIPS is shown in FIG. 8 by way of example as one possible type of code that may be generated and provided to device 802.

Therefore, the next time the device 802 encounters a given scenario (e.g. signature) indicated by the server 804, the device 802 has the ability to perform a corresponding mitigation action(s) that has also been conveyed to the device 802 by the server 804. For example, the device 802 may transmit event logs to the server 804 as part of the WD metrics. The event logs may include information indicative of the operation of the device 802. For example, the device 802 may indicate that it has performed a voice call under certain conditions and the call has failed, and/or it may indicate that it has performed a RAT selection under certain conditions and it has failed, etc. The server 804 may then process the aggregated data sets received from all the different devices (816), and may devise and/or define anomaly recovery strategies based on the received information and/or aggregated data sets (820, 822, 824, 826, 828, 830, 832, 834). This allows device 802 to leverage (learn from) the operation of other devices with which the device is not in direct communication, and avoid operational failure and/or compromised operation when encountering conditions similar or identical to those reported by the other devices as having caused a type and/or kind of operational failure of the other devices. Crowdsourced data points may thereby be used as the basis for device-specific mitigation actions that may be provided to the devices. Server container 812 may fetch new mitigations 836, and provide, via reverse analytics pipeline 838, information descriptive of and/or implementing the mitigation, for example as uncompiled CLIPS code to device 802 (840).

FIG. 9

Figure 9:
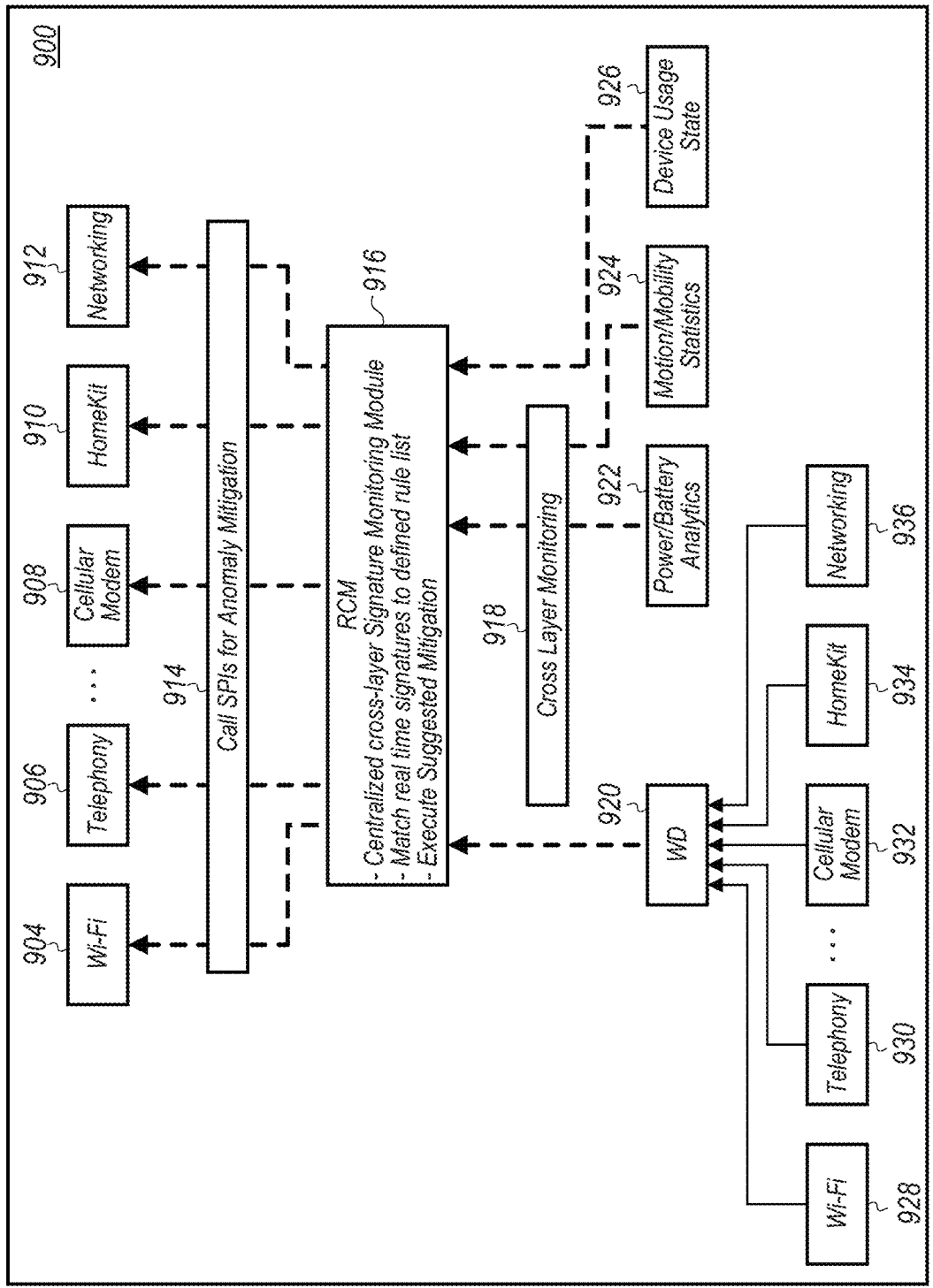
FIG. 9 shows a simplified block diagram of an exemplary architecture for a self-organizing device, according to some embodiments.

FIG. 9 shows a simplified block diagram of an exemplary architecture for a self-organizing device 900, according to some embodiments. As described above and shown in FIG. 8, for example, one or more devices that transmit information to the server may be indirectly assisting other devices in mitigating the effects of adverse operating conditions. Uncompiled code used for implementing the mitigation mechanism may be pushed to device by the server or may be fetched by the device. I general, principles of a SOD may by further summarized as follows. Anomalies may be identified through crowdsourced data analysis by machine intelligence (e.g. expert systems software). Responsive to the analysis, mitigation actions may be formed and/or defined, and translated into and/or implemented using appropriate means, for example software such as CLIPS. The SODs may pull the reverse analytics configurations, for example as uncompiled code when implemented using CLIPS, and may apply anomaly mitigations without the need to update their software version and/or compiled code. The concept may be further extended to hot-patching, thereby addressing device specific anomalies without transmitting worldwide software changes. As mentioned above, mitigation actions may be translated into and/or implemented using a suitable software language or code, such as CLIPS. Devices that recognize a specified signature identified by the expert system, and for which a mitigation action has been defined, may apply the matching mitigation techniques.

As shown in FIG. 9, the device 900 may include means for collecting wireless diagnostic (WD) information 920, for example diagnostics relating to Wi-Fi operations 928, telephony operations 930, cellular modem operations 932, home-kit operation 934, and/or networking operations 936, just to name a few. Additional or fewer types of diagnostic information may be collected per desired specifications. The RCM 916 may receive the diagnostic information 920 in addition to cross-layer monitoring information 918 pertaining to power and/or battery analytics 922 and motion and/or mobility statistics 924, and further in addition to device usage state information 926. The suggested mitigation action may be executed through calls to specific service provider interfaces (SPIs) corresponding to the various different functions and/or modules involved in the mitigation action (914), for example Wi-Fi 904, telephony 906, cellular modem (e.g. baseband processor) 908, home-kit 910 and/or networking 912, among others. In some embodiments, WD information 920 may be gathered through an analytics daemon (background process).

FIG. 10

Figure 10:
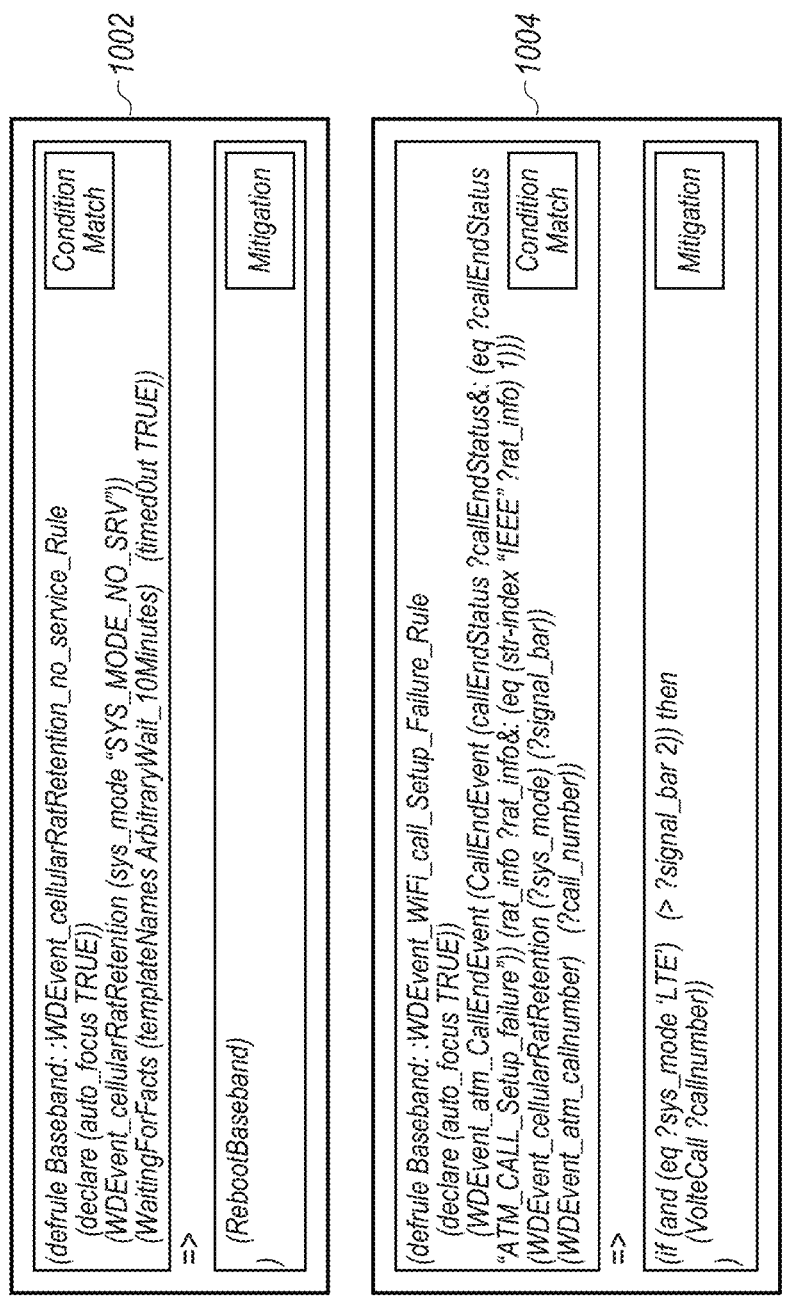
FIG. 10 shows exemplary code segments of uncompiled code implementing expert system rules for performing mitigation action(s) by a self-organizing device, according to some embodiments.

FIG. 10 shows exemplary code segments of uncompiled code implementing expert system rules for performing mitigation action(s) by a self-organizing device, according to some embodiments. The sample code segments shown in FIG. 10 may be used by a SOD to mitigate effects of certain conditions on the operation of the device. As illustrated, and previously mentioned, the rule may include two sections. A first section (or part) is the "Condition Match" which identifies the operating condition or scenario, for which mitigation may be sought and eventually performed. The second section (or part) is the "Mitigation" (action) that may be performed responsive to identifying the condition. The action may be obtained from an action catalog, or collection (table) of different mitigation actions available to the device. Actions may have corresponding SPIs that are used by the device to perform the mitigation action, as illustrated in FIG. 9, for example. FIG. 10 shows two different conditions and corresponding mitigating action(s), 1002 and 1004.

Example 1002 relates to the cellular service conditions. For example, if the device is in an out-of-service state for at least a time period of specified duration, the baseband processor (e.g. modem) may be rebooted. Example 1004 relates to Wi-Fi calls. When making a Wi-Fi call, and the Wi-Fi call fails, mitigation action(s) may be taken. The same call may be retried over cellular (e.g. VoLTE or VoNR) in response to the cellular signal strength meeting or exceeding a specified threshold (e.g. reaching at least a specified number of signal strength bars as displayed on the device screen). It is worth noting again the important advantage of having the ability to distribute and/or receive mitigation action recommendations and/or rules without requiring any compiled code change(s).

FIG. 11

FIG. 11 shows a selected row of an exemplary table 1102 that stores operating-condition information for use in devising mitigation action(s) for dynamic Wi-Fi calling policy for a self-organizing device, according to some embodiments. A single row is shown for illustrative purposes, but it should be understood that table 1102 may include additional rows all representative of data and/or information collected from globally dispersed devices for the purposes of analysis and/or devising and/or defining corresponding mitigation actions. As previously mentioned, identifying local anomalies or conditions and providing corresponding mitigating action(s) helps improve device operation, and the anomalies don't get diluted among all anomalies collected globally. One goal may be to identify devices that are adversely affected by specific conditions that may include device-specific issues and which may benefit from a quick resolution that addresses the adverse effects of those conditions. Accordingly, as indicated in table 1102, the collected WD information may include call direction, basic service set (BSS) load, adaptive multi-rate (AMR) codec, country of operation, call type, local area network (LAN) status, access point organizational unit identifier (AP OUI), Internet Protocol security (IPsec) use, Transmission Control Protocol (TCP) use, network identifier, call drop rate, and the number of devices which experienced the condition defined by the preceding/corresponding values appearing in the row. As indicated in table 1102, a device operating in a specific country (CID 15), in a certain coverage area (NID 15-2), using IPsec but not TCP, is shown to have historically dropped the call approximately 25% of the time (25.525). In other words, under the conditions described above, there is a 25% chance the device might drop the call. In present day systems, all policies are generally defined globally at a carrier level. For example, the identified carrier network NID 15-2 may be Wi-Fi preferred, while other carrier networks may be cellular preferred. However, in this case, instead of having a globally defined policy, a possible mitigation for the issue may include identifying local anomalies for a specific carrier (NID 15-2) and generate expert system rules that specify how the device is to operate the next time those specific conditions are encountered by the device. For example, the device may be instructed to prefer a cellular interface (e.g. LTE or NR) over a Wi-Fi interface. It should be noted that IPsec (IP security) refers to an Internet Engineering Task Force (IETF) standard suite of protocols between two communication points across the IP network that provide data authentication, integrity, and confidentiality, and also defines the encrypted, decrypted and authenticated packets. It should be further noted that BSS refers to the collection of stations that may communicate together within an 802.11 network, and which may not include an AP that provides a connection onto a fixed distribution system such as an Ethernet network.

FIG. 12

Figure 12:
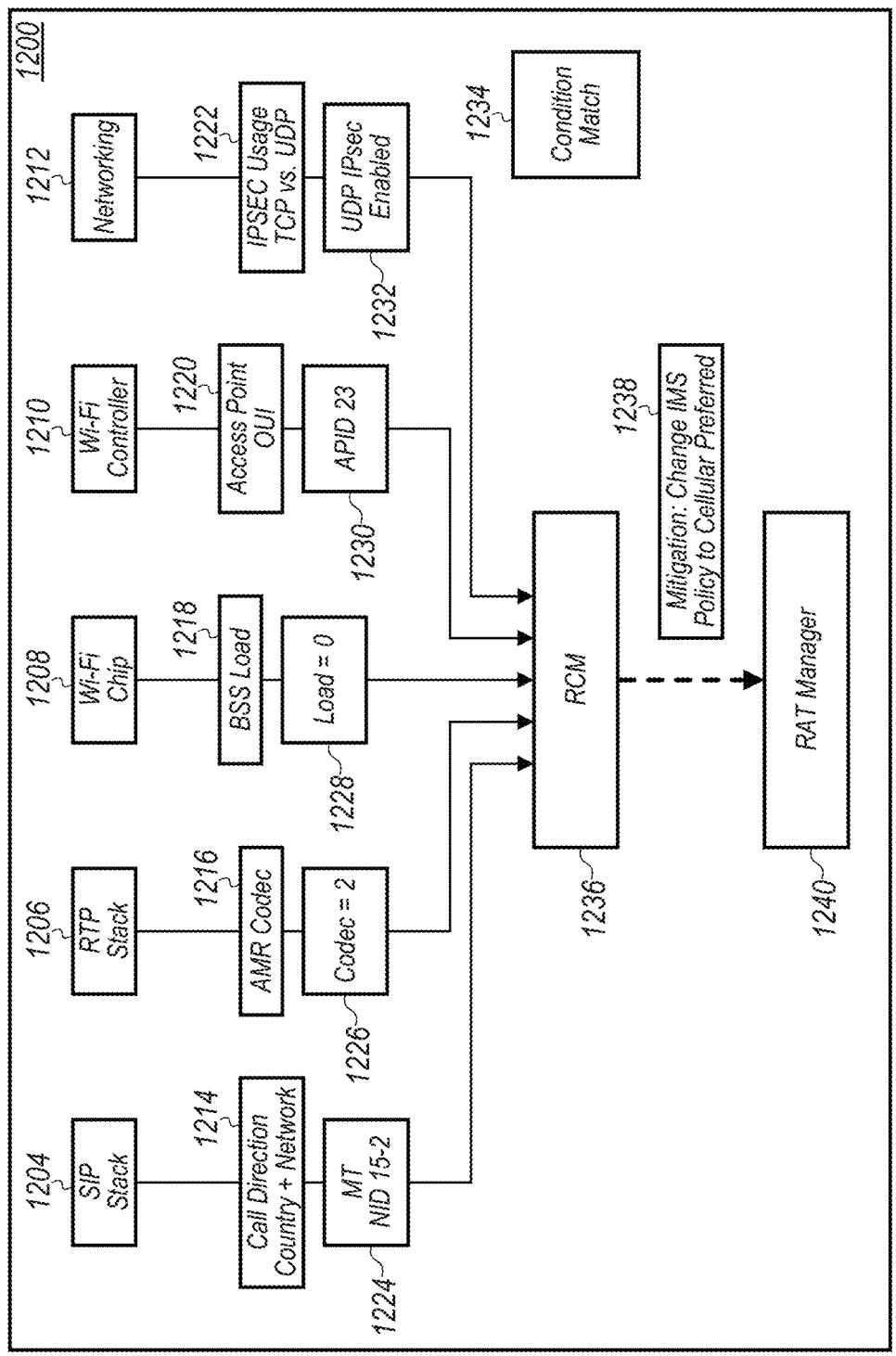
FIG. 12 shows an exemplary block diagram representative of the operation of a self-organizing device implementing mitigation action(s) for dynamic Wi-Fi calling policy, according to some embodiments.

FIG. 12 shows an exemplary block diagram representative of the operation of a self-organizing device 1200 implementing mitigation action(s) for a dynamic Wi-Fi calling policy, e.g. based on the collected information shown in FIG. 11, according to some embodiments. Accordingly, FIG. 12 shows the various operating domains and/or SW layers that may be used in administering the expert system rules for the use case shown in FIG. 11. The information monitored by the RCM 1236 may be received from a number of different operating domains and/or SW layers, including an SIP stack indication 1204 (corresponding to the call direction and country, and network information in table 1102), an RTP stack indication 1206 (corresponding to the AMR codec information in table 1102), a Wi-Fi chip indication 1208 (corresponding to the BSS load information in table 1102), a Wi-Fi controller indication 1210 (corresponding to the AP OUI in table 1102), and a networking indication 1212 (corresponding to the IPsec use and TCP use information in table 1102). Thus, the SIP stack indication 1204 provides information indicative of the call direction, country, and network (1214), which in the example is MT (for mobile terminated) and NID 15-2 (1224). The RTP stack indication 1206 provides information indicative of the AMR codec (1216), which in the example has a value of 2 (1226). The Wi-Fi chip indication 1208 provides information indicative of the BSS load (1218), which in the example has a value of 0 (1228). The Wi-Fi controller indication 1210 provides information indicative of the AP OUI (1220), which in the example is APID 23 (1230). The networking indication 1212 provides information indicative of IPsec usage with respect to TCP vs. UDP (1222), which in the example is UDP IPsec (1232). Overall there are five different operating domains, e.g., different layers of the SW or SW stack shown in FIG. 12. In the example shown in FIG. 12, the mitigation includes changing the Wi-Fi policy to cellular preferred (1238) upon having identified a condition match for the device (1234). The RCM 1236 may indicate this to RAT manager 1240.

FIG. 13

FIG. 13 shows selected rows of an exemplary table that stores operating-condition (e.g. wireless diagnostic) information for use in defining mitigation action(s) for radio access technology and carrier aggregation based modem stability, according to some embodiments. Three rows are shown for illustrative purposes, but it should be understood that table 1302 may include additional rows all representative of data and/or information collected from dispersed devices, e.g. from globally dispersed devices, for the purposes of analysis and/or devising and/or defining corresponding mitigation actions. As illustrated in FIG. 13, the table stores information indicative of how many times modem failures occur per device per periods of specific duration, e.g. per week. Furthermore, since the data in the table represents global data, it provides an indication of how many modem failures occur worldwide. In present day systems, even with SONs it might take up to a month for devices to receive a SW update to solve modem failure issues and achieve modem stability. This may result in negative user experiences during the wait period, which is undesirable. To alleviate this issue, since crowdsourced data analysis is performed, mitigation may be devised based on collected data. Accordingly, as indicated in table 1302, the collected WD information may include the device model, baseband (or modem) version of the device, country of operation, network identifier, roaming indication, reason for the modem and/or baseband failure, location latitude, location longitude, bandwidth CA combination, and the number of failures experienced by the devices within a specified time duration, under the conditions defined by the preceding values appearing in the respective corresponding rows. As shown in the use case in FIG. 13, specific device models (M10) experience modem failures in a specific location (a specific latitude indicated by LaNUM and a specific longitude indicated by LoNUM) on a specific network (NID 13-5). As indicated in the table, the failure occurs at specific location (latitude LaNUM and longitude LoNUM), on the same network (NID 13-5), when operating at a specific bandwidth and/or CA combination (10 MHz+10 MHz). Based on this information, an expert system devised and/or defined mitigation action may be provided to the device. Consequently, when the device encounters those conditions, as defined by the values shown in the respective rows in FIG. 13, it might indicate to the network that it does not support the specific CA bandwidth combination for which the modem failures were historically recorded. More generally, the device may indicate that it doesn't support a specific feature which was known to be associated with high modem (baseband) failures based on the collected crowdsourced data for the specific device models.

FIG. 14

Figure 14:
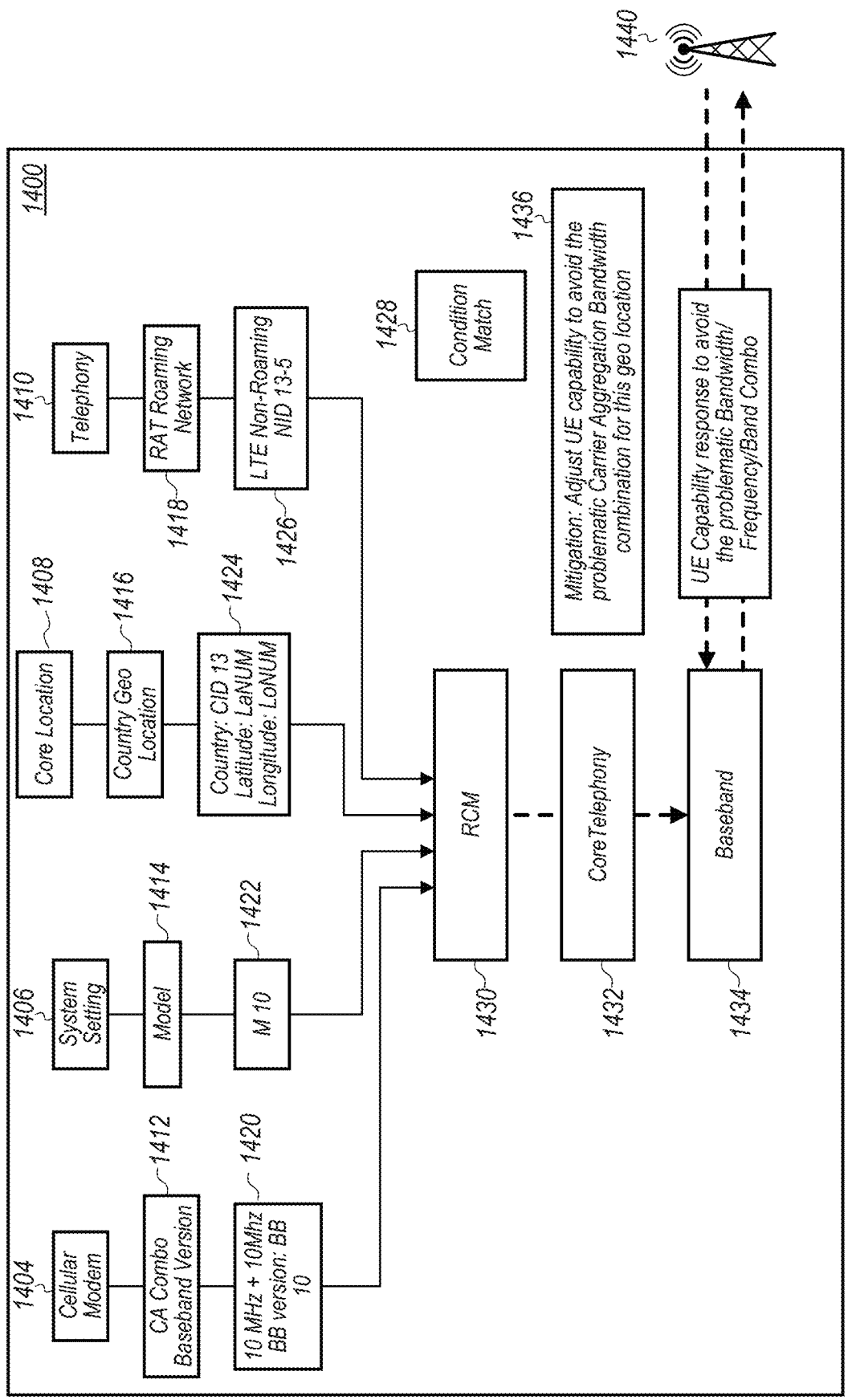
FIG. 14 shows an exemplary block diagram representative of the operation of a self-organizing device implementing mitigation action(s) for radio access technology and carrier aggregation based modem stability, according to some embodiments.

FIG. 14 shows an exemplary block diagram representative of the operation of a self-organizing device 1400 implementing mitigation action(s) for radio access technology and carrier aggregation based modem stability, based on the collected information shown in FIG. 13. Accordingly, FIG. 14 shows the various operating domains and/or SW layers involved in administering the expert system rules for the use case shown in FIG. 13. The information monitored by the RCM 1430 may be received from a number of different operating domains and/or SW layers, including a cellular modem indication 1404 (corresponding to baseband version and bandwidth CA combination information in table 1302), a system setting indication 1406 (corresponding to the model information in table 1302), a core location indication 1408 (corresponding to the country, latitude, and longitude information in table 1302), and a telephony indication 1410 (corresponding to the roaming and network information in table 1302). The cellular modem indication 1404 thus provides information indicative of the CA combination and baseband version (1412), which in the example is 10 MHz+10 MHz, with baseband version BB 10 (1420). The system setting indication 1406 provides information indicative of the device model number (1414), which in the example is M 10 (1422). The core location indication 1408 provides information indicative of the country geo location (1416), which in the example is country code CID 13 with latitude LaNUM and longitude LoNUM (1424). The telephony indication 1410 provides information indicative of RAT roaming and the network (1418), which in the example is LTE non-roaming on provider ID NID 13-5 (1426). Overall there are four different operating domains, e.g., different layers of the SW and/or SW stack shown in FIG. 14. In the example shown in FIG. 14, the mitigation includes adjusting the device capability to avoid the problematic carrier aggregation bandwidth combination for the specific geo location (1436) upon having identified a condition match for the device (1428). The RCM 1430 may indicate this to core telephony module 1432, which may control the baseband 1434 accordingly. Overall, UE 1400 may be conducting cellular communications with and via base station 1440.

FIG. 15

FIG. 15 shows selected rows of an exemplary table that stores operating-condition information for use in devising mitigation action(s) for cell barring based on anomaly signatures, according to some embodiments. Two rows are shown for illustrative purposes, but it should be understood that table 1502 may include additional rows all representative of data and/or information collected from dispersed devices, for example from globally dispersed devices, for the purposes of analysis and/or devising and/or defining corresponding mitigation actions. As indicated in table 1502, the collected WD information may include the specific service provider's cell ID or global cell ID, the device model, the wireless technology used, the call setup direction (mobile terminated vs. mobile originated), the frequency band used, the total number of attempted calls, and the percentage of the total number of attempted calls that have failed to setup, as experienced by the devices under the conditions defined by the values appearing in the respective rows. The data in table 1502 indicates that certain specific device models (M 10 and M 08) operating according to a specific technology (WCDMA) in a specific respective band (WCDMA 2000 and WCDMA 900, respectively) experience unusually high call failure rates. In other words, each respective row of data pertains to an identified condition and/or anomaly, indicative of the specific device model (indicated in the row) operating according to a specific cellular technology in a region served by a specific cell (having a specific cell ID) failing to receive almost 100% of the (mobile terminated voice) calls made to that device. for example, when device model M 10 is operating on cell CPCID 45 using WCDMA technology on band WCDMA 2000, the device fails to receive 99.8% of the calls made to the device. A similar scenario applies to device model M 08 given the conditions indicated in the row corresponding to device M 08.

FIG. 16

Figure 16:
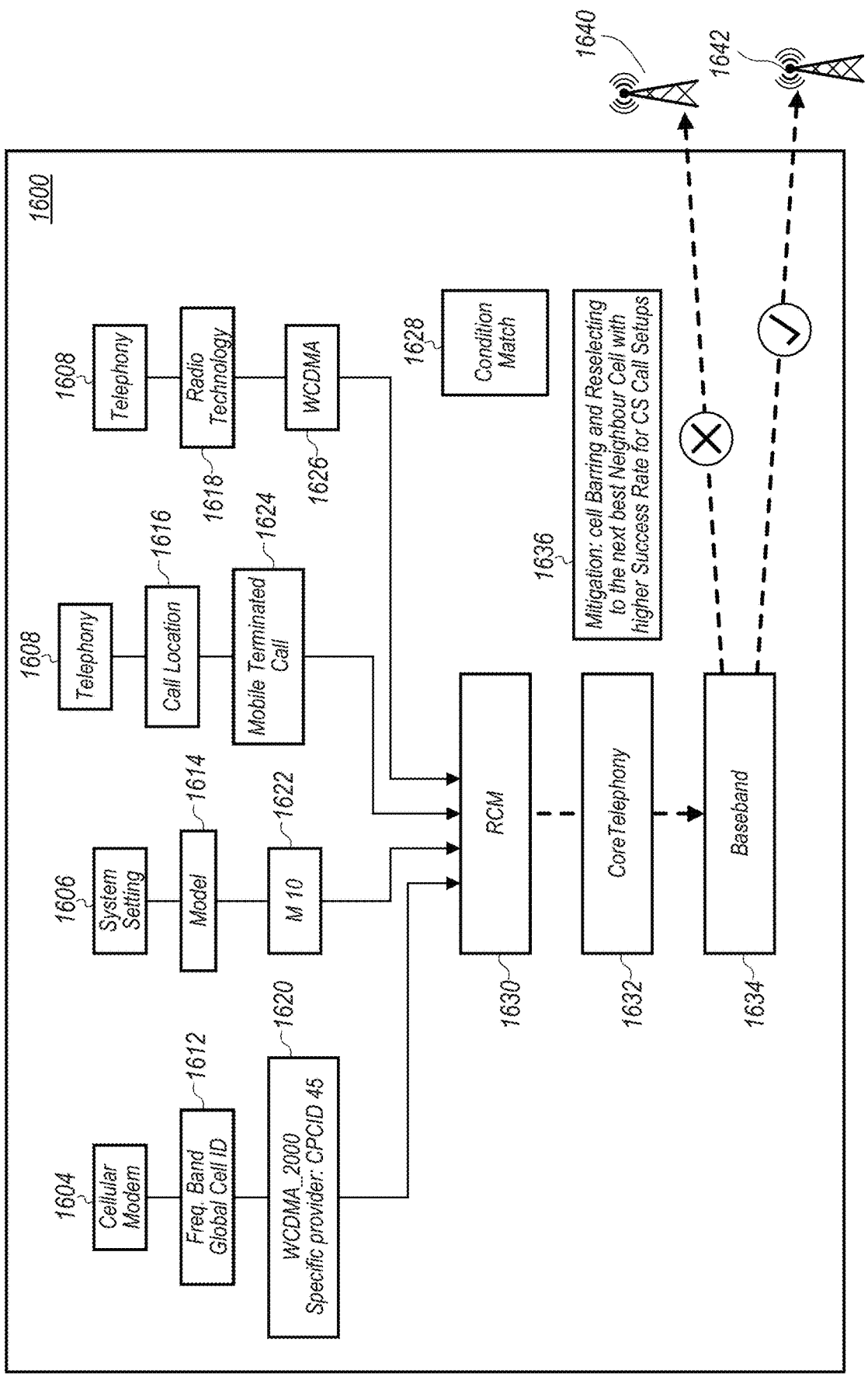
FIG. 16 shows an exemplary block diagram representative of the operation of a self-organizing device implementing mitigation action(s) for cell barring based on anomaly signatures, according to some embodiments.

FIG. 16 shows an exemplary block diagram representative of the operation of a self-organizing device 1600 implementing mitigation action(s) for cell barring based on anomaly signatures, based on the collected information shown in FIG. 15. Accordingly, FIG. 16 shows the various operating domains and/or SW layers involved in administering the expert system rules for the use case shown in FIG. 15. The information monitored by the RCM 1630 may be received from a number of different operating domains and/or SW layers, including a cellular modem indication 1604 (corresponding to the specific provider cell ID and frequency band information in table 1502), a system setting indication 1606 (corresponding to the device model information in table 1502), and a telephony indication 1608 (corresponding to the call setup and radio technology information in table 1502). The cellular modem indication 1604 thus provides information indicative of a frequency band and global cell identification (1612), which in the example is a WCDMA 2000 band on a specific provider's identified cell CPCID 45 (1620). The system setting indication 1606 provides information indicative of the device model number (1614), which, in the example, is M 10 (1622). The telephony indication 1608 provides information indicative of the call location (1616) and radio technology (1618), which in the example are mobile terminated call (1624) and WCDMA (1626), respectively. Overall there are four different operating domains, e.g., different layers of the SW or SW stack shown in FIG. 16. According to the mitigation action 1636 indicated in FIG. 16, instead of merely considering the link conditions for making cell selection decisions, crowdsourced data based mitigation (matched to the conditions, 1628) may result in improved operation of specific devices. For example, in the case illustrated in FIGS. 15 and 16, the cell measurements may provide every indication of cell 1640 being favorable. However, for some reason, other factors might result in the above described call failures for the specific devices operating according to the specific cellular technology in the coverage area of cell 1640, as indicated by the crowdsourced (collected) WD data in table 1502 of FIG. 15. Leveraging this crowdsourced data information, the device may then reselect to a different cell 1642, even though by all other counts cell 1640 (which may even be the current serving cell) might be considered the best candidate cell to serve the device. Thus, the device may bar cell 1640 regardless of the RF conditions corresponding to cell 1640, when matching the specific conditions exemplified by respective rows of crowdsourced data in table 1502 of FIG. 15. The RCM 1630 may indicate the mitigation action to the core telephony module 1632, which may control baseband 1634 accordingly.

It should be noted that the various values for the WD information shown in tables 1102, 1302, and 1502 are to be interpreted as exemplary ersatz values provided for the purposes of illustration.

Crowdsourced Mitigation and Hot Patching

For further improvements, results of attempted mitigation(s) and/or mitigation actions may be classified. Different mitigation actions may be evaluated to determine whether or not the mitigation helped the recovery. In some embodiments, each subset of devices of multiple subsets of devices may be provided a different mitigation action corresponding to the same condition and/or scenario as defined by the collected crowdsourced data. Analytics may be performed on the respective results of the mitigation actions from each subset of devices to determine which mitigation action(s) of a number of different mitigations/mitigation actions was the most successful in solving or alleviating the problem for the given condition and/or scenario. The most successful mitigation may then be deployed to the affected devices. For example, the most successfully mitigation may be deployed globally. This may be helpful, for example, when determining and/or identifying a mitigation technique, e.g. a global mitigation technique and/or action from among multiple mitigation techniques and/or actions.

For example, a predefined set of possible mitigations/mitigation actions may be defined for (or may be defined to correspond to) each anomaly domain, e.g., each condition and/or scenario identified from the crowdsourced data. Based on the anomaly domain, all possible mitigations and/or mitigation actions may be deployed to respective randomly selected subsets of devices. For example, a first mitigation (action) may be deployed to a first set of devices, a second mitigation (action) may be deployed to a second set of devices, a third mitigation (action) may be deployed to a third set of devices, and so on and so forth. The different sets of devices may be mutually exclusive as defined by which mitigation (action) was deployed to which device. The impact of each mitigation (action) may be classified as "helped recovery" vs. "did not help recovery". Based on the crowdsource performance of each mitigation technique per device, the winning mitigation method may be pushed and/or deployed to the all devices that have been identified as having experienced the targeted anomaly.

Therefore, where multiple mitigation actions are possible, the server(s) may provide the various different mitigation (action) options corresponding to the same scenario and/or conditions (e.g. corresponding to the same anomaly) to different devices or groups of devices, establishing a feedback loop in which devices apply different mitigations and/or mitigation actions corresponding to a same conditions and/or anomaly, and transmit information indicative of the respective results of the mitigations and/or mitigation actions (e.g. succeeded vs. failed) back to the server(s). Based on the feedback loop, a best mitigation action(s) corresponding to a given condition and/or anomaly may be established and identified as the preferred mitigation and/or mitigation action to be applied by the devices at large (e.g. globally) when encountering the corresponding condition and/or anomaly.

In some embodiments, hot patching may be used to enable operating system (OS) updates without requiring the device to reboot. Hot patching may enable servers (e.g. cloud servers) to push critical software fixes to targeted devices that have been severely impacted by a software error, without having to release remote radio unit fixes for all devices running the given OS. Hot patching may use dynamic software update (DSU) techniques that allow devices to modify the currently running binary, and at the same time ensure that proper operation of the system is maintained after the patch has been applied. Examples of hot patching techniques that may be used for the purposes of providing mitigations and/or mitigation actions, for example, include but are not limited to:

Replacing a current function implementation with a new function implementation in binary code; and Loading a new daemon code and transferring control from the old binary code to the new binary once the new binary is ready to be used. This technique may require daemon implementation to adopt a new framework that enables hot patching.

FIG. 17

Figure 17:
FIG. 17 shows an exemplary world map illustrating the geolocations of devices experiencing operational failures, and the extent to which devices experience operational failures in different geolocations.

FIG. 17 shows an exemplary world map illustrating the geolocations of devices experiencing a specific operational failure, and the extent to which the devices experience that failure in different geolocations. Specifically, the map illustrates the geographic concentration of devices experiencing baseband processor (or modem) failure. Hot patching may be performed based on the indication on the map. For example, the darkest areas represent geolocations where baseband failures are highest, and devices experiencing baseband failure may therefore benefit from hot patching solutions the most. The lightest areas on the map represent geolocations where devices rarely if ever experience the specific failure, e.g. baseband failure as illustrated in the example of FIG. 17.

Privacy and Collected Data

As described above, one aspect of the present technology is the gathering and use of data available from specific and legitimate sources to improve the operation of mobile devices, oftentimes mobile devices different than the mobile devices from which data may have been collected. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, and exercise information), date of birth, or any other personal information.

The present disclosure recognizes that the use of such personal information data, in the present technology, can be used to the benefit of users. For example, the personal information data can be used by multiple user devices to monitor failures and run an auto-run recovery mechanism to address user specific issues. Accordingly, use of such personal information data enables users to improve operation of their devices.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection and/or sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users are provided with the ability to selectively block the use of, or access to, personal information data. That is, the present disclosure contemplates that hardware and/or software elements can be provided to prevent or block access to such personal information data, if users wish not to share such data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, information may be delivered to users based on aggregated non-personal information data or a bare minimum amount of personal information, such as the content being handled only on the user's device or other non-personal information available to the content delivery services.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) and/or device may be the basis of a corresponding method for operating a base station, by interpreting each message and/or signal X received by the UE and/or device in the downlink as message and/or signal X transmitted by the base station, and each message and/or signal Y transmitted in the uplink by the UE and/or device as a message and/or signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising: a processor configured to cause a device to: monitor first wireless diagnostic information, from a plurality of different software layers corresponding to different operating domains associated with wireless communications of the device; identify an operating condition of the wireless communications of the device presently experienced by the device, based on the monitored diagnostic information; and perform a mitigation action through calls to specific service provider interfaces (SPIs) involved in the mitigation action, responsive to identifying the operating condition, wherein the specific SPIs are included in a plurality of SPIs corresponding to the different operating domains, and wherein the mitigation action mitigates adverse effects that the operating condition has on the wireless communications of the device.

2. The apparatus of claim 1, wherein the processor is configured to further cause the device to: receive code implementing the mitigation action; and perform the mitigation action according to the received code.

3. The apparatus of claim 2, wherein the code includes one of: uncompiled code; or binary code usable for hot patching an operating system of the device.

4. The apparatus of claim 1, wherein the plurality of different software layers includes different layers of a software stack.

5. The apparatus of claim 1, wherein the mitigation action is defined to correspond to the operating condition based on analysis of crowdsourced wireless diagnostic information from a plurality of devices.

6. The apparatus of claim 5, wherein the crowdsourced wireless diagnostic information includes one or more device-specific information corresponding to respective devices of the plurality of devices.

7. The apparatus of claim 5, wherein the mitigation action is one of a plurality of different mitigation actions that all correspond to the operating condition.

8. The apparatus of claim 7 wherein the mitigation action is selected from among the plurality of different mitigation actions based on respective results of performing each mitigation action of the plurality of mitigation actions.

9. A device comprising: radio circuitry configured to facilitate wireless communications of the device; and a processor communicatively coupled to the radio circuitry and configured to cause the device to: monitor first wireless diagnostic information, from a plurality of different software layers corresponding to different operating domains associated with wireless communications of the device; identify an operating condition of the wireless communications of the device presently experienced by the device, based on the monitored diagnostic information; and perform a mitigation action through calls to specific service provider interfaces (SPIs) involved in the mitigation action, responsive to identifying the operating condition, wherein the specific SPIs are included in a plurality of SPIs corresponding to the different operating domains, and wherein the mitigation action mitigates adverse effects that the operating condition has on the wireless communications of the device.

10. The device of claim 9, wherein the processor is configured to further cause the device to: receive code implementing the mitigation action; and perform the mitigation action according to the received code.

11. The device of claim 10, wherein the code includes one of: uncompiled code; or binary code usable for hot patching an operating system of the device.

12. The device of claim 9, wherein the plurality of different software layers includes different layers of a software stack.

13. The device of claim 12, wherein the crowdsourced wireless diagnostic information includes one or more device-specific information corresponding to respective devices of the plurality of devices.

14. The device of claim 12, wherein the mitigation action is one of a plurality of different mitigation actions that all correspond to the operating condition.

15. The device of claim 14 wherein the mitigation action is selected from among the plurality of different mitigation actions based on respective results of performing each mitigation action of the plurality of mitigation actions.

16. The device of claim 9, wherein the mitigation action is defined to correspond to the operating condition based on analysis of crowdsourced wireless diagnostic information from a plurality of devices.

17. A non-transitory memory element storing instructions executable by a processor to cause a centralized control device to:
analyze crowdsourced wireless diagnostic information received from a plurality of devices, wherein the wireless diagnostic information is from a plurality of different software layers corresponding to different operating domains associated with wireless communications of the plurality of devices;
identifying an operating condition, based on the analysis of the crowdsourced wireless diagnostic information;
define a mitigation action corresponding to the operating condition; and
transmit, to a device, information representative of the mitigation action, wherein the information is usable by the device to perform the mitigation action through calls to service provider interfaces (SPIs) corresponding to the different operating domains to mitigate adverse effects of the operating condition when the operating condition is experienced by the device.

18. The non-transitory memory element of pf claim 17, wherein the instructions are executable to further cause the centralized control device to:
define a plurality of mitigation actions corresponding to the operating condition, wherein the mitigation action is comprised in the plurality of mitigation actions; and
transmit respective information representative of a different mitigation action of the plurality of mitigation actions to a different respective set of devices for each different mitigation action of the plurality of mitigation actions, wherein the respective information is usable by each device of the respective receiving set of devices to perform the mitigation action represented by the information to mitigate adverse effects of the operating condition when the operating condition is experienced by the device of the respective receiving set of devices.

19. The non-transitory memory element of claim 18, wherein the instructions are executable to further cause the centralized control device to:
receive respective results corresponding to each different mitigation action having been performed;
analyze the respective results; and
select one mitigation action from among the plurality of mitigation actions as a preferred mitigation action, based on the analysis of the respective results.

20. The non-transitory memory element of claim 18, wherein the instructions are executable to further cause the centralized control device to:
transmit information representative of the preferred mitigation action to a subset of the plurality of devices that includes devices that have been affected by the operating condition.

* * * * *

UNITED STATES PATENT AND TRADEMARK OFFICE
CERTIFICATE OF CORRECTION

| | |
|---|---|
| PATENT NO. | : 11,490,453 B2 |
| APPLICATION NO. | : 16/872165 |
| DATED | : November 1, 2022 |
| INVENTOR(S) | : Gencer Cili et al. |

It is certified that error appears in the above-identified patent and that said Letters Patent is hereby corrected as shown below:

In the Claims

Column 34, Line 30, delete "pf"

Signed and Sealed this
Twentieth Day of June, 2023

Katherine Kelly Vidal
*Director of the United States Patent and Trademark Office*